United States Patent
Davis et al.

(10) Patent No.: US 7,218,227 B2
(45) Date of Patent: May 15, 2007

(54) TRACKING SYSTEM AND ASSOCIATED METHOD

(75) Inventors: Brian J. Davis, Aurora, OH (US); Gary Kochis, Uniontown, OH (US); E. Kent Miller, Cincinnati, OH (US)

(73) Assignee: Argo-Tech Corporation, Cleveland, OH (US)

( * ) Notice: Subject to any disclaimer, the term of this patent is extended or adjusted under 35 U.S.C. 154(b) by 178 days.

(21) Appl. No.: 10/513,839

(22) PCT Filed: May 6, 2003

(86) PCT No.: PCT/US03/14483

§ 371 (c)(1),
(2), (4) Date: Nov. 5, 2004

(87) PCT Pub. No.: WO03/104834

PCT Pub. Date: Dec. 18, 2003

(65) Prior Publication Data

US 2005/0174235 A1    Aug. 11, 2005

Related U.S. Application Data

(60) Provisional application No. 60/378,283, filed on May 7, 2002.

(51) Int. Cl.
    G08B 13/14    (2006.01)
(52) U.S. Cl. .............. 340/572.1; 340/572.4; 340/572.8; 340/539.13; 340/539.22; 340/825.49; 340/568.1; 340/5.92; 340/426.1; 340/425.19; 701/36; 701/213; 701/300
(58) Field of Classification Search ............. 340/572.1, 340/572.4, 572.8, 539.13, 539.22, 825.49, 340/568.1, 5.92, 426.1, 426.19; 701/36, 701/213, 300
See application file for complete search history.

(56) References Cited

U.S. PATENT DOCUMENTS 4,884,208 A  *  11/1989  Marinelli et al. ........... 701/300

(Continued)

FOREIGN PATENT DOCUMENTS

CN    1261243 A    7/2000

(Continued)

OTHER PUBLICATIONS

Crains Cleveland, NE Ohio.CrainTech, *Mizar positioning itself in GPS market*, Jan. 24, 2001 (2 pages).

(Continued)

*Primary Examiner*—Tai Nguyen
(74) *Attorney, Agent, or Firm*—Fay Sharpe LLP

(57) ABSTRACT

A tracking system (10) for tracking movable assets (16) and a method for using the system are provided. The tracking system includes a monitoring device (22), a tracking information network (20), a data communication network (18), a tracker tag (12), and a tracking information server (14). The tracker tag operates independent from the asset and uses GPS technology. The tracking information server provides tracking information and related information to a subscriber. The method is for tracking the movable asset and providing tracking information to the subscriber. In one embodiment, the tracker tag is in communication with an Iridium satellite constellation (28) and the tracking information is displayed to the subscriber when the asset is substantially anywhere in the world. In another embodiment, the monitoring device is in communication with the Iridium satellite constellation and the tracking information is displayed to the subscriber when the subscriber is substantially anywhere in the world, preferably via the Internet (36).

60 Claims, 14 Drawing Sheets

U.S. PATENT DOCUMENTS

| | | | |
|---|---|---|---|
| 5,588,005 A | 12/1996 | Ali et al. |
| 5,608,412 A | 3/1997 | Welles, II et al. |
| 5,629,693 A | 5/1997 | Janky |
| 5,633,875 A | 5/1997 | Hershey et al. |
| 5,682,139 A | 10/1997 | Pradeep et al. |
| 5,686,888 A | 11/1997 | Welles, II et al. |
| 5,691,980 A | 11/1997 | Welles, II et al. |
| 5,752,218 A | 5/1998 | Harrison et al. |
| 5,798,458 A | 8/1998 | Monroe |
| 5,835,377 A | 11/1998 | Bush |
| 5,864,315 A | 1/1999 | Welles, II et al. |
| 5,889,474 A | 3/1999 | LaDue |
| 5,917,433 A | 6/1999 | Keillor et al. |
| 5,959,529 A | 9/1999 | Kail, IV |
| 5,959,577 A | 9/1999 | Fan et al. |
| 5,974,349 A | 10/1999 | Levine |
| 6,009,356 A | 12/1999 | Monroe |
| 6,067,044 A | 5/2000 | Whelan et al. |
| 6,069,570 A | 5/2000 | Herring |
| 6,072,396 A | 6/2000 | Gaukel |
| 6,108,524 A | 8/2000 | Hershey et al. |
| 6,144,916 A | 11/2000 | Wood, Jr. et al. |
| 6,184,801 B1 | 2/2001 | Janky |
| 6,239,700 B1 | 5/2001 | Hoffman et al. |
| 6,246,320 B1 | 6/2001 | Monroe |
| 6,253,064 B1 | 6/2001 | Monroe |
| 6,292,724 B1 | 9/2001 | Apsell et al. |
| 6,311,060 B1 | 10/2001 | Evans et al. |
| 6,317,049 B1 | 11/2001 | Toubia et al. |
| 6,339,397 B1 | 1/2002 | Baker |
| 6,377,210 B1 | 4/2002 | Moore |
| 6,392,692 B1 | 5/2002 | Monroe |
| 6,456,852 B2 | 9/2002 | Bar et al. |
| 6,456,937 B1 | 9/2002 | Doner et al. |
| 6,472,976 B1 | 10/2002 | Wohl |
| 6,490,523 B2 | 12/2002 | Doner |
| 6,509,867 B1 | 1/2003 | McGibney |
| 6,510,380 B1 | 1/2003 | Curatolo et al. |
| 6,512,455 B2 | 1/2003 | Finn et al. |
| 6,512,478 B1 | 1/2003 | Chien |
| 6,519,529 B2 | 2/2003 | Doyle |
| 6,542,076 B1 | 4/2003 | Joao |
| 6,545,601 B1 | 4/2003 | Monroe |
| 6,553,336 B1 | 4/2003 | Johnson et al. |
| 6,611,757 B2 | 8/2003 | Brodie |
| 6,614,394 B2 | 9/2003 | Honda et al. |
| 6,789,013 B2 | 9/2004 | Annett et al. |
| 6,799,094 B1 | 9/2004 | Vaida et al. |
| 2002/0006800 A1 | 1/2002 | Mohi |
| 2002/0055924 A1 | 5/2002 | Liming |
| 2002/0089434 A1 | 7/2002 | Ghazarian |
| 2002/0111819 A1 | 8/2002 | Li et al. |
| 2002/0116123 A1 | 8/2002 | Lampe et al. |
| 2002/0128769 A1 | 9/2002 | Der Ghazarian et al. |
| 2002/0169539 A1 | 11/2002 | Menard et al. |
| 2002/0177476 A1 | 11/2002 | Chou |
| 2003/0007473 A1 | 1/2003 | Strong et al. |
| 2003/0030568 A1 | 2/2003 | Lastinger et al. |
| 2003/0050038 A1 | 3/2003 | Haave et al. |
| 2003/0069648 A1 | 4/2003 | Douglas et al. |
| 2003/0117316 A1 | 6/2003 | Tischer |
| 2003/0225492 A1 | 12/2003 | Cope et al. |
| 2004/0183673 A1 | 9/2004 | Nageli |

FOREIGN PATENT DOCUMENTS

| | | |
|---|---|---|
| CN | 1277362 A | 12/2000 |
| EP | 1 152 478 B1 | 7/2001 |
| EP | 1 184 829 A2 | 3/2002 |
| JP | 2000 162300 | 6/2000 |
| JP | 2000 196744 | 7/2000 |
| JP | 2000 214771 | 11/2000 |

OTHER PUBLICATIONS

*Iridium Satellite Proposes Real-Time Cockpit Voice and Flight Data Monitoring to Federal Aviation Administration*, Iridium Satellite LLC, <http://www.iridium.com/corp/iri_corp-news.asp?newsid=25>, Oct. 2, 2001 (5 pages).

* cited by examiner

TRACKING SYSTEM AND ASSOCIATED METHOD

This application claims the benefit of U.S. Provisional Patent Application Ser. No. 60/378,283, filed on May 7, 2002, the disclosure of which is incorporated herein by reference.

BACKGROUND OF THE INVENTION

The invention relates to a system for tracking movable assets and a method for using the system. It finds particular application in conjunction with a tracking device that operates independent from the asset using global positioning system technology and a tracking information server that provides tracking information along with various types of supplemental information to a subscriber and will be described with particular reference thereto. However, it is to be appreciated that the invention is also amenable to other applications.

It is common to provide transponders and/or black boxes on commercial airliners and some general aviation aircraft. The transponders and/or black boxes record either a location of an aircraft and/or activities occurring within the aircraft. While such systems are useful to obtain information for aircraft flight and operation, drawbacks exist in technology as it is now implemented. These drawbacks include a relatively low level of interaction between aircraft at various stages of a flight pattern, including the stages from taxiing and take-off through airborne flight patterns to landing. Further, these systems are commonly controlled and interconnected to the electronic infrastructure of the airliner or aircraft. Such a design provides the potential for disablement of these systems, for example, if intruders obtain unauthorized control of the aircraft. Some U.S. patents related to tracking aircraft and other objects are identified below.

U.S. Pat. No. 6,545,601 to Monroe discloses a security and surveillance system for aircraft on the ground that incorporates a plurality of strategically spaced sensors including video imaging generators, audio sensors, motion detectors, and fire and smoke detectors for monitoring critical components and critical areas of both the interior and the exterior of a commercial transport such as an aircraft. The captured data and images are transmitted to a ground based security station for display on a monitor and may be recorded on a "black box" recorder as well as on a ground based recording system. The multiple audio and image signals are multiplexed and sequenced utilizing split screen technology in order to minimize the recording and monitoring hardware required to process the images.

U.S. Pat. No. 6,519,529 to Doyle discloses a system for tracking and monitoring the intermodal status of cargo trailers. In addition to the information provided by a Global Positioning System (GPS) unit, the system monitors the status of various sensors on the trailer. The GPS unit provides the location and velocity of a trailer. A wheel monitoring unit provides the status of the wheels of the trailer, specifically whether there is rotation of the wheels or not. Anti-lock braking systems are used to provide signal information indicative of the wheel rotation status. An independent wheel rotation sensor is also used to provide the wheel rotation status. A computer processor determines the intermodal movement status of the trailer using the wheel rotation status and the location and velocity information.

U.S. Pat. No. 6,510,380 to Curatolo et al. discloses a security and tracking apparatus, comprising at least two signaling units in communicating proximity, and means for identifying the location of the signaling units. In one embodiment, a security and tracking apparatus is provided, comprising at least two signaling units in communicating proximity, and means for identifying and automatically transmitting the location of the signaling units when the signaling units are separated by more than a preselected distance. In a preferred embodiment, a method is provided to locate a person, an animal, or a material asset, comprising providing in contact with the person, animal, or material asset, at least two signaling units in communicating proximity, wherein at least one signaling unit is small and hidden and securely attached to the person, animal, or material asset, and the signaling units having means for identifying the location of the signaling units to a monitoring station; activating means for identifying the location of the signaling units by referencing the GPS system; and notifying the monitoring station of said geographic location.

U.S. Pat. No. 6,490,523 to Doner discloses a method and apparatus for managing locomotives. The apparatus includes an on-board tracking system including a locomotive interface, a computer, a GPS receiver, and a communicator, the computer programmed to determine a position of the locomotive and to transmit the position via the communicator, the computer further programmed to obtain locomotive discretes and to transmit the locomotive discretes via the communicator. The method includes the steps of operating each on-board system to determine when its respective locomotive departs a locomotive assignment point, operating the on-board systems to determine a departure condition, to send a locomotive position message to a data center at a time corresponding to the locomotive assignment point, to simultaneously collect GPS location data for each respective locomotive and at the data center, collecting locomotive position messages corresponding to the locomotive assignment point to determine localized groups of locomotives, identifying candidate consists and lead locomotives.

U.S. Pat. No. 6,339,397 to Baker discloses a portable self-contained tracking unit that includes an enclosure attached to a mounting plate, with a hollow interior cavity housing a GPS receiver, a microprocessor and a transmitter. The GPS receiver will receive tracking data and the microprocessor will process the tracking data into a data packet. The transmitter transmits the data packet to a remote receiving station, for transmission to a central database. Photoelectric cells are mounted on the enclosure to recharge batteries which provide power to the electrical components of the tracking unit. The enclosure is designed with a pair of vertically oriented side panels which are generally orthogonally oriented so that the solar panels mounted on the side panels will maintain a favorable solar incidence angle during a wide range of orientations. The transmitter is a cellular telephone with an antenna mounted within the enclosure but spaced a distance from the metal mounting plate and electrical components approximately one-quarter wavelength of the operating frequency of the transmitter. The enclosure is formed of a radio frequency and optically transparent material, so that the antenna and the solar panels may be housed within the hollow interior cavity of the enclosure. In the method of the invention, tracking data is periodically transmitted via cellular phone to a cellular service provider, thence to a data service bureau which sends the data over the Internet to the database of a central server computer. The central server computer will decode the information and provide an interface and value added products such as maps and reports for customers via a web page on the Internet.

Currently, each general aviation aircraft (about four hundred thousand (400,000) in the United States) is asked to volunteer compliance with the transponder positioning systems that are currently in place. Only one-third (⅓) of the general aviation aircraft comply. The other two-thirds (⅔) are either not equipped with a transponder or do not comply for other reasons.

In reviewing the existing technology, it is desirable to create a tracking system that increases the intelligence and interactive service communication between an aircraft and ground stations throughout its entire flight pattern, as well as to insure independence in the communication between the aircraft and ground stations. It is desirable to provide a reliable and cost effective method to track aircraft, with a unique aircraft number, any time during idle time, taxiing, and in flight. It is also deemed desirable to provide interactive service communications and independent communications of the aforementioned type to other modes of transportation as well.

SUMMARY OF THE INVENTION

In one aspect of the invention, an apparatus for tracking a movable asset and providing tracking information to a monitoring device is provided. The apparatus includes a tracker tag and a tracking information server. The tracker tag is adapted to selectively receive position and time data from multiple global positioning system satellites of a global positioning system satellite constellation. The position data representing a position of each global positioning system satellite from which data was received with respect to center of Earth and the time data representing a time of day associated with the position data. The tracker tag disposed along an exterior of the movable asset at a location facilitating reception of the position and time data, the tracker tag combining the position and time data from the multiple global positioning system satellites for selectively transmitting combined position and time data via a data communication network. The tracker tag is adapted to receive command and control information via the data communication network. The tracker tag is electrically isolated from the asset and inoperative from equipment associated with the asset. The tracking information server is for command and control of the tracker tag. The tracking information server is adapted to selectively transmit command and control information to the tracker tag via the data communication network. The tracking information server is adapted to receive combined position and time data from the tracker tag via the data communication network. The tracking information server is adapted to selectively receive command and control information from the monitoring device via a tracking information network. The tracking information server is adapted to selectively process the combined position and time data based on preprogrammed instructions and command and control information to produce the tracking information. The tracking information is associated with the asset and selectively accessible to the monitoring device via the tracking information network.

In another aspect of the invention, a tracking system is provided. The tracking system includes a monitoring device, a tracking information network, a data communication network, a tracker tag, and a tracking information server. The monitoring device is for displaying tracking information associated with a movable asset. The tracking information network is in communication with the monitoring device for communicating the tracking information to the monitoring device. The tracker tag is adapted to selectively receive position and time data from multiple global positioning system satellites of a global positioning system satellite constellation. The position data representing a position of each global positioning system satellite from which data was received with respect to center of Earth and the time data representing a time of day associated with the position data. The tracker tag is disposed along an exterior of the movable asset at a location facilitating reception of the position and time data. The tracker tag combines the position and time data from the multiple global positioning system satellites for selectively transmitting combined position and time data via the data communication network. The tracker tag receives command and control information via the data communication network. The tracking information server is for command and control of the tracker tag. The tracking information server selectively transmits command and control information to the tracker tag via the data communication network. The tracking information server receives combined position and time data from the tracker tag via the data communication network. The tracking information server selectively receives command and control information from the monitoring device via the tracking information network. The tracking information server selectively processes the combined position and time data to produce the tracking information. The tracking information is selectively accessible to the monitoring device via the tracking information network.

In still another aspect of the invention, a method for tracking a movable asset and providing tracking information to a subscriber is provided. The method includes: a) associating the subscriber with a tracker tag and the tracker tag with the moveable asset, wherein the tracker tag is disposed along an exterior of the movable asset at a location in which the tracker tag has line of sight access to the sky during normal movement of the asset, wherein the tracker tag is electrically isolated from the asset and inoperative from equipment associated with the asset, b) granting the subscriber using a monitoring device access to a Web site via a tracking information network, wherein the Web site includes at least one tracking information Web page that displays a map suitable for monitoring movement of the asset, c) receiving position and time data from at least four global positioning system satellites of a global positioning system satellite constellation at the tracker tag, the position data representing a position of each global positioning system satellite from which data was received with respect to center of Earth and the time data representing a time of day associated with the position data, d) communicating the position and time data to a tracking information server via a data communication network, e) processing the position and time data in a trilateration fashion to produce XYZ and time data, the XYZ data representing a latitude, a longitude, and an altitude, respectively, and the time data representing a time of day associated with the XYZ data, f) displaying the XYZ and time data on the at least one Web page and overlaying a symbol on the map at a coordinate associated with the XYZ data, and g) repeating steps c) through f) for a predetermined time at a predetermined interval.

In one embodiment of the method, the data communication network includes a PSTN, an Iridium satellite constellation, and an Iridium satellite/PSIN gateway in communication with the PSTN and the Iridium satellite constellation, wherein the tracker tag is in communication with the Iridium satellite constellation and the tracking information is displayed to the subscriber at the monitoring device when the asset is substantially anywhere in the world with line of sight access to the sky.

In another embodiment of the method, the tracking information network includes an Internet, an Iridium satellite constellation, and an Iridium satellite/Internet gateway in communication with the Internet and the Iridium satellite constellation, wherein the monitoring device is in communication with the Iridium satellite constellation and the tracking information is displayed to the subscriber at the monitoring device when the subscriber is substantially anywhere in the world.

Benefits and advantages of the invention will become apparent to those of ordinary skill in the art upon reading and understanding the description of the invention provided herein.

BRIEF DESCRIPTION OF THE DRAWINGS

The invention is described in more detail in conjunction with a set of accompanying drawings.

DETAILED DESCRIPTION OF THE PREFERRED EMBODIMENT

Figure 1:
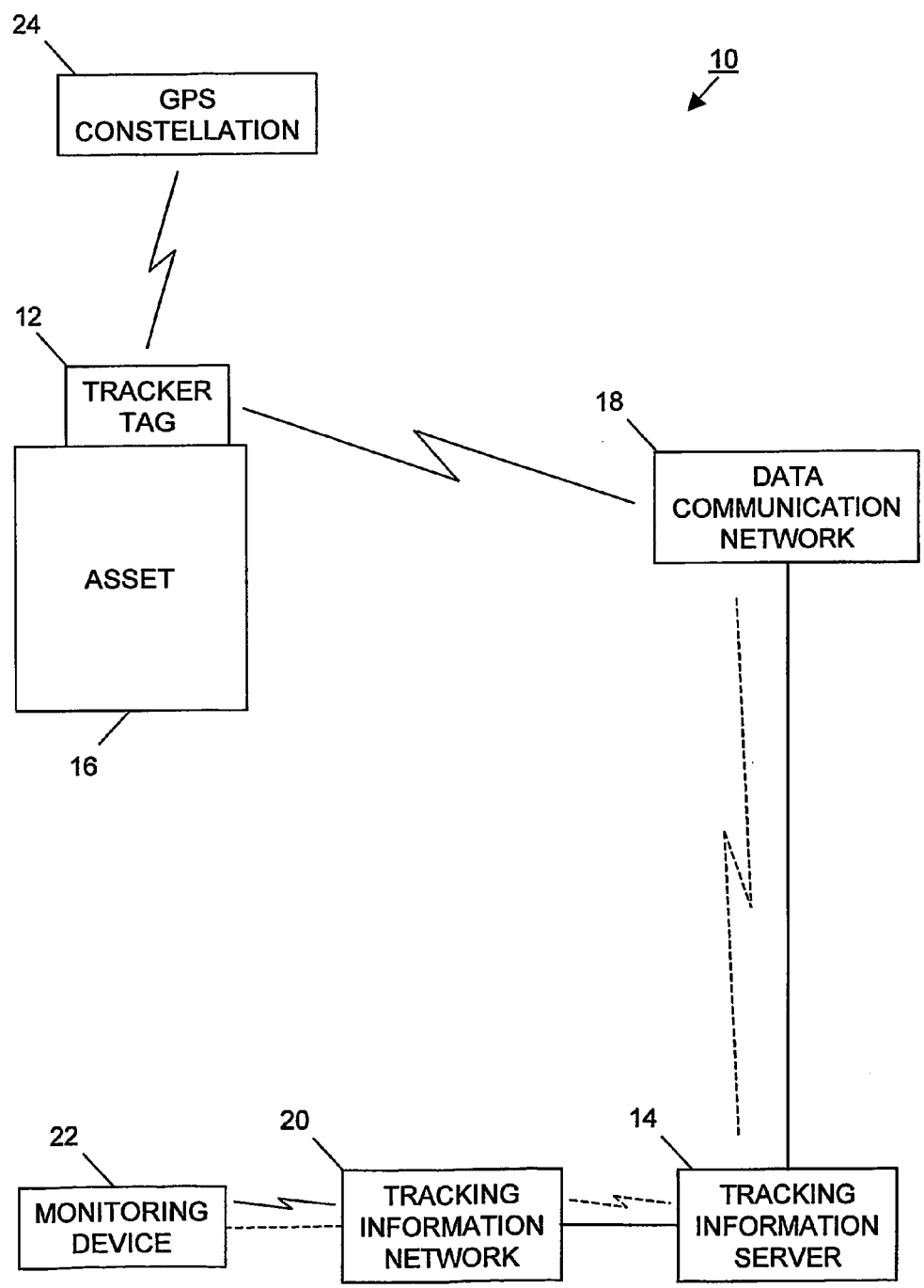
FIG. 1 is a block diagram of an embodiment of a tracking system incorporating the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

With reference to FIG. 1, an embodiment of a tracking system 10 includes a tracker tag 12, a tracking information server 14, an asset 16, a data communication network 18, a tracking information network 20, a monitoring device 22, and a GPS satellite constellation 24. The GPS satellite constellation 24 is preferably a public GPS satellite constellation including a plurality of GPS satellites 240 (FIG. 3) orbiting the Earth. Each GPS satellite includes a clock and has an understanding of its own orbit with respect to the center of the Earth. Each GPS satellite continually broadcasts its position with respect to the center of the Earth and time with respect to a time of day reference.

GPS satellites are well known for enabling users with GPS receivers to locate their positions on or near the Earth. Such systems are commonly used for navigation in many different applications, such as aviation, nautical travel, automobile travel, etc. Preferably, the GPS satellite constellation 24 includes enough GPS satellites and the satellites are spaced apart so that from any point on Earth, four GPS satellites will be above the horizon. Equipment with a GPS receiver can determine its position with respect to the center of the Earth in longitude, latitude, and altitude from position and time data from four GPS satellites. If position and time data is received from three GPS satellites, the equipment can determine its position in longitude and latitude. The equipment can also determine its velocity from the position and time data.

One public GPS satellite constellation is the NAVSTAR GPS satellite constellation developed by the U.S. Department of Defense. The NAVSTAR GPS satellite constellation includes 27 GPS satellites (24 operational, 3 spare) orbiting at about 12,000 miles (19,300 km). The GPS satellites are dispersed around six planes with at least four GPS satellites in each plane. The orbits are arranged so that at any time anywhere on Earth, there are at least four GPS satellites above the horizon. Preferably, the GPS satellite constellation 24 is the NAVSTAR GPS satellite constellation. However, the tracking system 10 works just as well with any other public GPS satellite constellation, such as the GLONASS satellite constellation maintained by the Russian Federation or the Galileo satellite constellation introduced by European countries. The GPS satellite constellation 24 could also be a private satellite system.

Preferably, the asset 16 is a movable asset, such as an aircraft. However, the tracker tag 12 may be secured to any type of asset for which tracking information is desired. For example, a truck, a van, an automobile, a cargo container, a trailer, a bus, a train, a locomotive, a rail car, and a watercraft. The tracker tag 12 is secured to the asset 16 in a manner so that it normally has line of sight access to the sky. Preferably, the tracker tag 12 is removably secured to a top-side exterior of the asset 16 at its highest point. However, any point with line of sight access to at least three or four GPS satellites is suitable. Access to at least four GPS satellite is required if altitude tracking information is desired. Preferably, the tracker tag 12 positioned on the asset 16 so that no operators, crew, or passengers can access tracker tag 12 during normal movement of the asset. This may prevent terrorists and other foes from being able to remove or disable the tracker tag 12. Preferably, the tracker tag 12 is independently powered and electrically isolated from the asset and does not require manual intervention during normal operation of the tracking system 10. Again, this feature may prevent terrorists and other foes from being able to disable the tracker tag 12.

As long as the tracker tag 12 has line of sight access to the sky, it selectively receives wireless communications that are continuously broadcast by the GPS satellite constellation 24. The wireless communications include the position and time data continuously broadcast by each of multiple GPS satellites 240 (FIG. 3) that are within line of sight of the tracker tag 12. The tracker tag 12 combines the position and time data from each of the multiple GPS satellite to form combined position and time data. The tracker tag 12 is in communication with the tracking information server 14 via the data communication network 18 and selectively transmits the combined position and time data to the tracking information server 14. Preferably, with respect to the data communication network 18 and the tracking information server 14, the tracker tag 12 is a thin client using TCP/IP protocol.

The tracker tag 12 determines whether or not to receive the position and time data based on command and control information from the tracking information server 14. Similarly, the tracker tag 12 determines whether or not to transmit the combined position and time data based on command and control information from the tracking information server 14. Additionally, the tracker tag 12 may include an on-board sensor and preprogrammed instructions to determine whether or not to receive the position and time. Similarly, the tracker tag 12 may include preprogrammed instructions to determine whether or not to transmit the combined position and time. Moreover, the tracker tag 12 may also use an on-board sensor in conjunction with the preprogrammed instructions to determine whether or not to transmit the combined position and time. The tracker tag 12 may receive the position and time data and store the combined position and time data for subsequent transmission.

The tracker tag 12 may include an algorithm to resolve the position and time data for its own position with respect to the center of the Earth. The algorithm generates XYZ data representing latitude, longitude, and altitude (requiring position and time data from at least four GPS satellites) or XY data representing latitude and longitude (requiring position and time data from at least three GPS satellites) in a trilateration fashion depending on the type of tracking information desired. Time data associated with XYZ or XY data is also generated. The resolution of the resolving algorithm is about 18 inches in latitude (X), about 18 inches in longitude (Y), and about 18 inches in altitude (Z). If the resolving algorithm is implemented in the tracker tag 12, the combined position and time data includes XYZ or XY data and the associated time data. Typically, the resolving algorithm reduces the amount of data transmitted to the tracking information server. The tracker tag 12 may include a data compression process to further reduce the amount of time required for data transmissions. The tracker tag 12 may include encryption and decryption processes for secured communications with the tracking information server 14. As another alternative, the tracker tag 12 may include the encryption process to secure the combined position and time data transmissions. This may prevent terrorists and other foes from using the combined position and time data to locate and/or target the asset.

Communications between the tracker tag 12 and the data communication network 18 are wireless. Communications between the tracking information server 14 and the data communication network 18 are preferably by wire. However, this communication may also be wireless. The data communication network 18 may implement any combination of wireless and wired communication technologies suitable for communications between the tracker tag and the tracking information server 14. The data communication network 18 may be a public network, a private network, or any combination of public and private networks.

For example, the data communication network 18 may include one or more of data communication satellite systems, terrestrial telephone systems, cable television systems, computer networks, and other suitable data communication networks in any combination. The data communication satellite system may include a satellite telephone system or a private satellite network. The satellite telephone system may be any public satellite telephone system, such as the Iridium satellite system, the Globalstar satellite system, the Orbcomm satellite system, the Inmarsat satellite system, or any other suitable public satellite telephone system. The terrestrial telephone system may include any combination of land line or wireless telephone systems, such as the public switched telephone network (PSTN), broadband integrated services digital network (ISDN), digital subscriber line (DSL), cellular telephone network, personal communication system (PCS) network, or any other suitable terrestrial telephone network. The computer network may include any combination of wire line local area networks (LANs) and wireless LANs. Preferably, the computer network is Ethernet (i.e., IEEE 802.3 for wire line LAN and IEEE 802.11 for wireless LAN). However, any other suitable network communication protocols may be implemented, such as token ring, fiber distributed data interface (FDDI), ARCNET, and HiperLAN.

These various communication technologies may be combined in any combination to form a wide area network (WAN) or a metropolitan area network (MAN). Notably, the wireless communication between the tracker tag 12 and the data communication network may be implemented by satellite, cellular telephone, PCS, wireless LAN, or any other suitable wireless technology.

The tracking information server 14 selectively provides command and control information to the tracker tag 12 and receives the combined position and time data from the tracker tag 12. The tracking information server 14 selectively processes the combined position and time data and selectively generates certain tracking information for monitoring movement of the asset 16. The tracking information server 14 selectively makes the tracking information accessible to an authorized user of the monitoring device 22 via the tracking information network 20. The authorized user, for example, may be a subscriber, an employee assigned to monitor the asset, an operator/administrator associated with the tracking information server 14. The tracking information server 14 may also selectively receive command and control information from an authorized user of the monitoring device 22. Preferably, the tracking information server 14 is compatible with data communications via the data communication network 18 and the tracking information network 20 in TCP/IP protocol.

The tracking information server 14 may include preprogrammed instructions to determine: i) whether or not to provide commands or control information to the tracker tag 12, ii) whether or not to process the combined position and time data, iii) whether or not to generate tracking information and what type of tracking information to generate, iv) whether or not a user is authorized, v) whether or not to make tracking information accessible to an authorized user, and vi) whether or not to receive commands or control information from an authorized user. Other types of preprogrammed instructions are also possible. The preprogrammed instructions may be initially configured, edited, and/or supplemented by an authorized user of the monitoring device 22. Some of the preprogrammed instructions may be initially configured, edited, and/or supplemented, while the tracking system 10 is tracking the asset 16.

The commands may include tracker tag commands to begin receiving position and time data, begin transmitting combined position and time data, stop transmitting combined position and time data, and stop receiving position and time data. Commands may also include tracking information server commands to begin processing combined position and time data, to begin generating certain types of tracking information, to stop generating certain types of tracking information, and to stop processing combined position and time data. Other types of commands are also possible.

The control information may include a tag profile, a link from the tracker tag to the asset, links from the asset to elements associated with the asset, and link information associated with either the asset or an element of the asset.

Typically, the tag profile is tailored to the type of asset being tracked and the tracking information services contracted for by a subscriber. The tag profile may, for example, specify real-time tracking, tracking on certain detected events, periodic tracking, and/or tracking on command. Additionally, the tag profile may include thresholds associated with detected events, parameters associated with predicting estimated arrival times and/or travel paths, types of tracking information authorized for monitoring, and types of tracking information reports authorized. More specifically, the tag profile may include: i) tracking information to be monitored and frequency, ii) vibration thresholds associated with startup and shutdown, iii) vibration thresholds associated with normal movement, iv) restricted areas, v) hazardous areas, vi) planned course, vii) high stress conditions, viii) fuel and fuel consumption information, and ix) reports to be processed and report frequency. Additional information may also be included in the tag profile.

Typically, the tracker tag 12 includes tracker tag identification data that is embedded with communications to the tracking information server 14. This is how the tracking information server 14 identifies the combined position and time data, particularly when multiple tracker tags 12 are communicating with the tracking information server 14. The link from the tracker tag 12 to the asset 14 allows the tracking information server to associate the combined position and time data with the asset so that the tracking information can reference the asset. For example, the tracker tag identification data may be linked to an aircraft tail no. Similarly, the combined position and time data can also be associated with an element of the asset by the additional link from the asset to the element. For example, an element can be a fuel pump on an aircraft engine. The first link may associate the tracker tag identification data with the aircraft tail number and the second link may associate a fuel pump serial no. with the aircraft tail no. Additional examples of elements include operators, crew member, passengers, asset owners, cargo items, operational equipment items, and support equipment items. Other types of elements are also possible. Multiple elements can be identified and linked to a given asset.

Link information is descriptive information associated with a link For example, i) asset identification data, ii) asset certification, iii) asset operational information, iv) asset maintenance information, v) element identification data, vi) element certification, vii) element operational information, and viii) element maintenance information. Other types of link information are also possible.

The preprogrammed instructions in either the tracking information server 14 or the tracker tag 12 may include any combination of the various types of control information. Likewise, the commands are typically included in the preprogrammed instructions so that, as certain events are detected or as certain sequences occur, the commands can be communicated automatically.

The tracking information server 14 may include the algorithm to resolve position and time data for the tracker tag 12 from raw GPS position and time data included in the combined position and time data. The algorithm generates XYZ data representing latitude, longitude, and altitude (requiring position and time data from at least four GPS satellites) or XY data representing latitude and longitude (requiring position and time data from at least three GPS satellites) in the same manner as described above if the resolving algorithm is performed in the tracker tag 12. The algorithm also generates time data associated with XYZ or XY data. The tracking information server 14 may include a data decompression process to decompress compressed combined position and time data transmissions. The tracking information server 14 may include encryption and decryption processes for secured communications with the tracker tag 12. As another alternative, the tracking information server 14 may include the decryption process to decrypt secure combined position and time data transmissions.

The tracking information network 20 may implement any combination of wireless and wired communication technologies suitable for communications between the tracking information server 14 and the monitoring device 22. Preferably, communications between the tracking information network 20 and the tracking information server 14 and between the tracking information network 20 and the monitoring device 22 are both by wire. However, either of these communications may wireless or both may be wireless. Like the data communication network 18, the tracking information network 20 may be a public network, a private network, or any combination of public and private networks. As such, the networks identified above for the data communication network 18 may also be implemented in the tracking information network 20. Notably, the tracking information network 20 may include the Internet, which is accessible through each of the major communication systems identified above. The tracking information network 20 and the data communication network 18 may be linked together forming a common tracking system network.

The monitoring device 22 is any type of device suitable for communicating with the tracking information server 14 and displaying the tracking information. For example, a personal computer, a notebook computer, a personal digital assistance, a wireless personal digital assistance, a cellular telephone, a satellite telephone, a pager, or any other suitable display device. Preferably, the tracking information server 18 provides tracking information via a Web server connected to the Internet with suitable security measures. Accordingly, the monitoring device 22 preferably has access to the Internet for receiving the tracking information and monitoring movement of the asset. However, the public Internet is not required for communications between the monitoring device 22 and the tracking information server 14. Other alternatives include communications through a private network or one-to-one dial-up-type connections through a public network.

While FIG. 1 depicts a tracking system 10 with one tracker tag 12 and one monitoring device 22, the system can be expanded to include multiple tracker tags and/or multiple monitoring devices. Use of multiple tracker tags allows a user to monitor multiple assets, such as a fleet of aircraft or all airborne aircraft. Use of multiple monitoring devices allows multiple users to monitor an asset. For example, a cargo aircraft can be monitored by various users associated with the cargo, as well as users associated with aircraft owner, the aircraft fuel pump manufacturer, the transport company, and government regulatory agencies. Of course use of both multiple tracker tags and multiple monitoring devices provides a combination of additional scenarios.

Preferably, the tracking information server 14 is housed in a single facility. However, it may be distributed among multiple facilities and networked together. Preferably, the tracking information server 14 is a ground-based system. However, other types of platforms are possible, such as an airborne platform or a ship-based platform.

Figure 2:
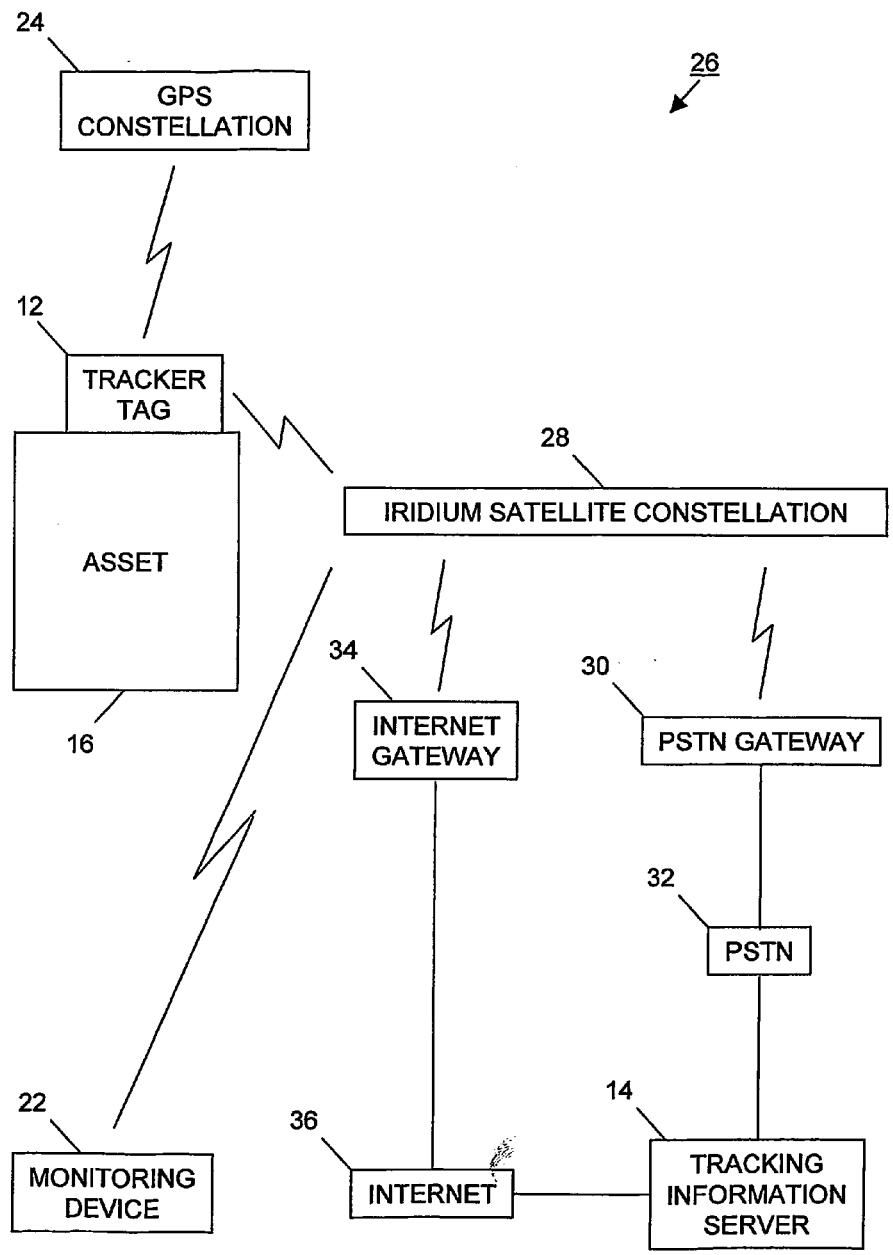
FIG. 2 is a block diagram of an embodiment of a global tracking system incorporating the invention.

With reference to FIG. 2, an embodiment of a global tracking system 26 includes the tracker tag 12, the tracking information server 14, the asset 16, the monitoring device 22, the GPS satellite constellation 24, an Iridium satellite constellation 28, an Iridium satellite/PSTN gateway 30, a PSTN 32, an Iridium satellite/Internet gateway 34, and an Internet 36. The tracker tag 12, tracking information server 14, asset 16, monitoring device 22, and GPS satellite constellation 24 are as described above in reference to FIG. 1.

A global implementation of the tracking system 26 is provided by a data communication network 18 (FIG. 1) and a tracking information network 20 (FIG. 1) that provide global coverage (i.e., worldwide communications). The data communication network 18 (FIG. 1) is provided by a satellite telephone system and a terrestrial telephone network. As shown, the preferred satellite telephone system is the Iridium telephone system. However, other satellite telephone systems that provide global coverage may also be implemented in the global tracking system 26. The preferred terrestrial telephone network is the PSTN. However, other types of terrestrial telephone networks may be implemented. More specifically, the data communication network 18 (FIG. 1) is provided by the Iridium satellite constellation 28, the Iridium satellite/PSTN gateway 30, and the PSTN 32.

In the embodiment being described, the tracking information network 20 (FIG. 1) is provided by a satellite telephone system and the Internet 36. As shown, the preferred satellite telephone system is the Iridium telephone system. However, other satellite telephone systems that provide global coverage may also be implemented in the global tracking system 26. More specifically, the tracking information network 20 (FIG. 1) is provided by the Iridium satellite constellation 28, the Iridium satellite/Internet gateway 34, and the Internet 36.

Global coverage of the tracker tag 12 secured to the asset is provided by the Iridium satellite system. Likewise, global access to the tracking information by a subscriber/client user at the monitoring device is provided by the Iridium satellite system. In an additional embodiment of a global tracking system, if global access is not required, the tracking information network 20 (FIG. 1) may implement other communication networks that provide regional or local access to the tracking information server 14 while the data communication network 18 provides global coverage. Conversely, in an another embodiment of a global tracking system, if global tracking is not required, the data communication network 18 (FIG. 1) may implement other communication networks that provide regional or local tracking of the asset while the tracking information network 20 provides global coverage.

Figure 3:
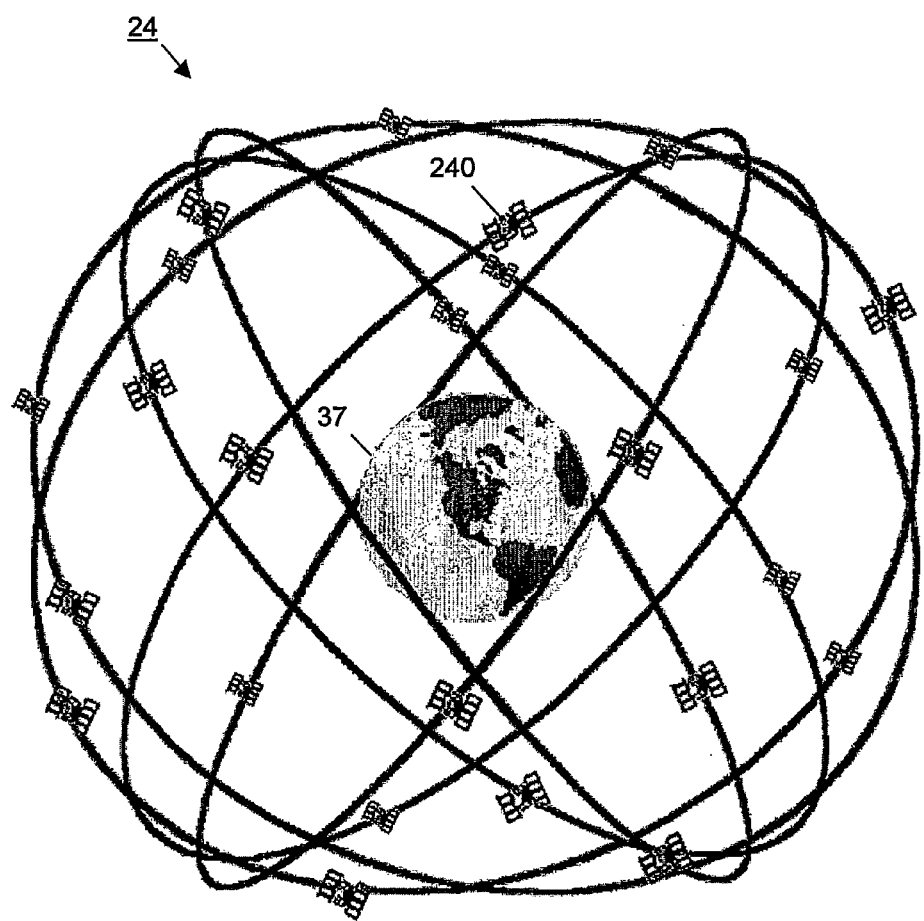
FIG. 3 depicts a GPS satellite constellation with multiple satellites in Earth orbit.

With reference to FIG. 3, the GPS satellite constellation 24 includes multiple GPS satellites 240 orbiting Earth 37.

Figure 4:
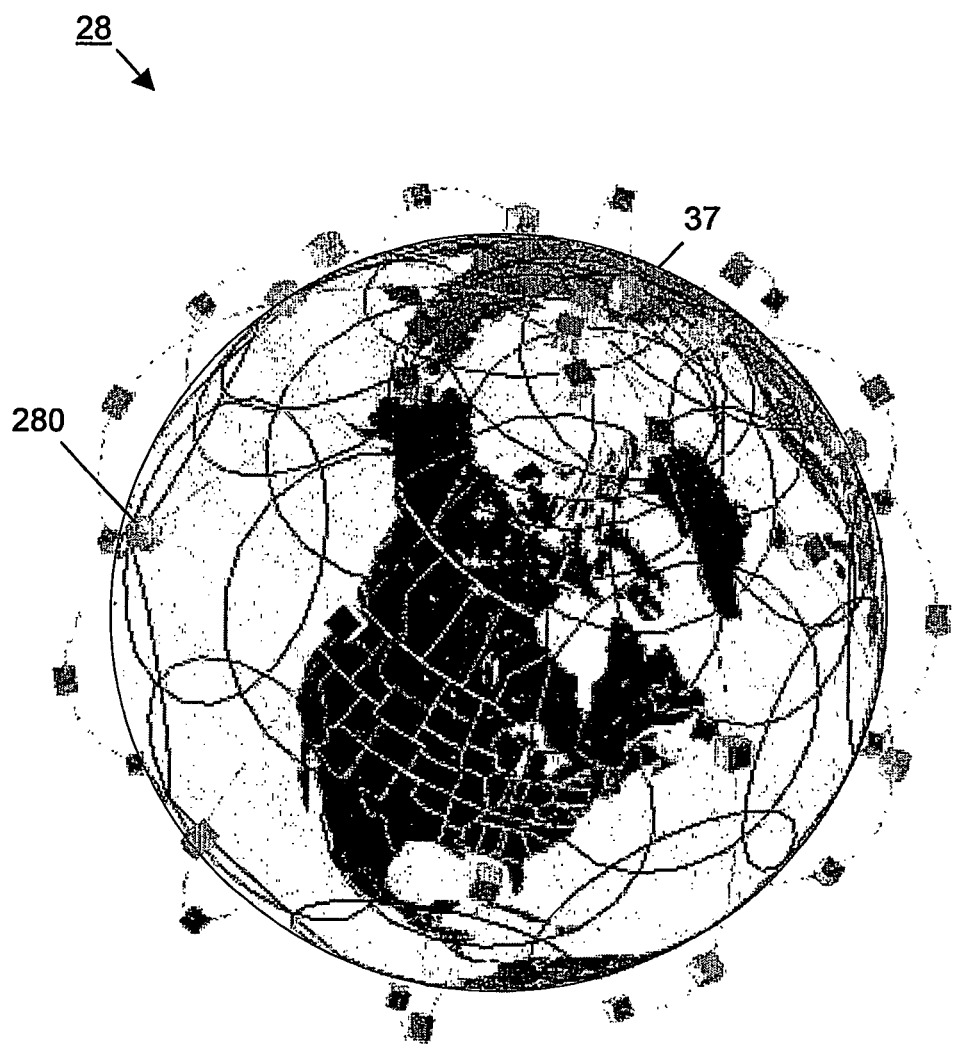
FIG. 4 depicts an Iridium satellite constellation with multiple satellites in Earth orbit.

With reference to FIG. 4, the Iridium satellite constellation 28 includes 66 Iridium satellites 280 orbiting Earth 37 in low Earth orbit (LEO) at an average altitude of 420 miles (670 km). The Iridium satellites 280 lie in six (6) orbital planes, with eleven (11) satellites per orbital plane. Within the Iridium satellite system, the Iridium satellites 280 communicate with Iridium telephones (i.e., radio transceivers or two-way radios) and gateways to terrestrial land line and wireless telephone systems, as well as gateways to the Internet. Notably, with the Internet gateway, the Iridium satellite system is an Internet service provider (ISP). Worldwide voice, data, and Internet services over the Iridium satellite system are provided by Iridium Satellite LLC.

Figure 5:
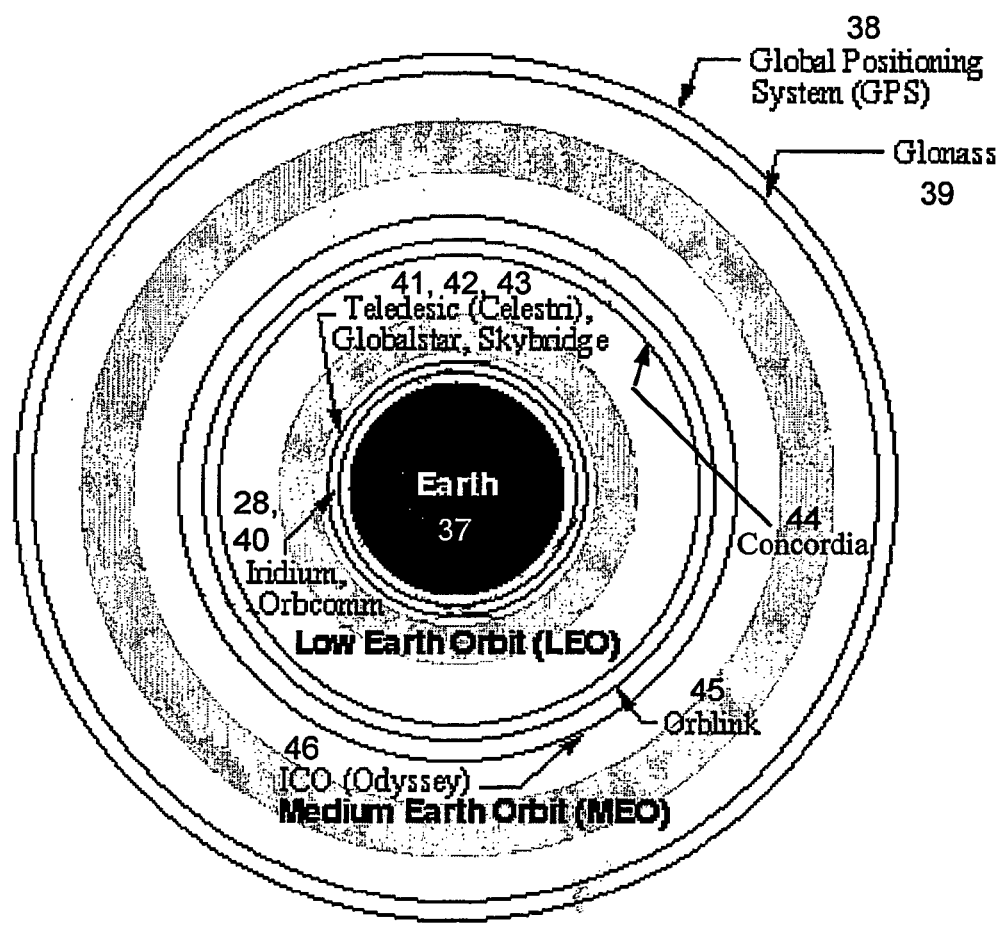
FIG. 5 illustrates orbital altitudes of various satellite constellations.

With reference to FIG. 5, the altitude of exemplary data communication satellite constellation orbits are illustrated. The Iridium satellite constellation 28, an Orbcomm satellite constellation 40, a Teledesic satellite constellation 41, a Globalstar satellite constellation 42, and a Skybridge satellite constellation 43 orbit Earth 37 at LOE. A Concordia satellite constellation 44, an Orblink satellite constellation 45, and an ICO satellite constellation orbit at a medium Earth orbit (MEO). A NAVSTAR GPS satellite constellation 38 and a Glonass satellite constellation 39 orbit Earth at a higher altitude.

FIG. 5 illustrates various orbital altitudes for satellite constellations that may be used to implement the present application. By use of one or more of these satellite systems, the intended operations are obtained as discussed herein.

Figure 6:
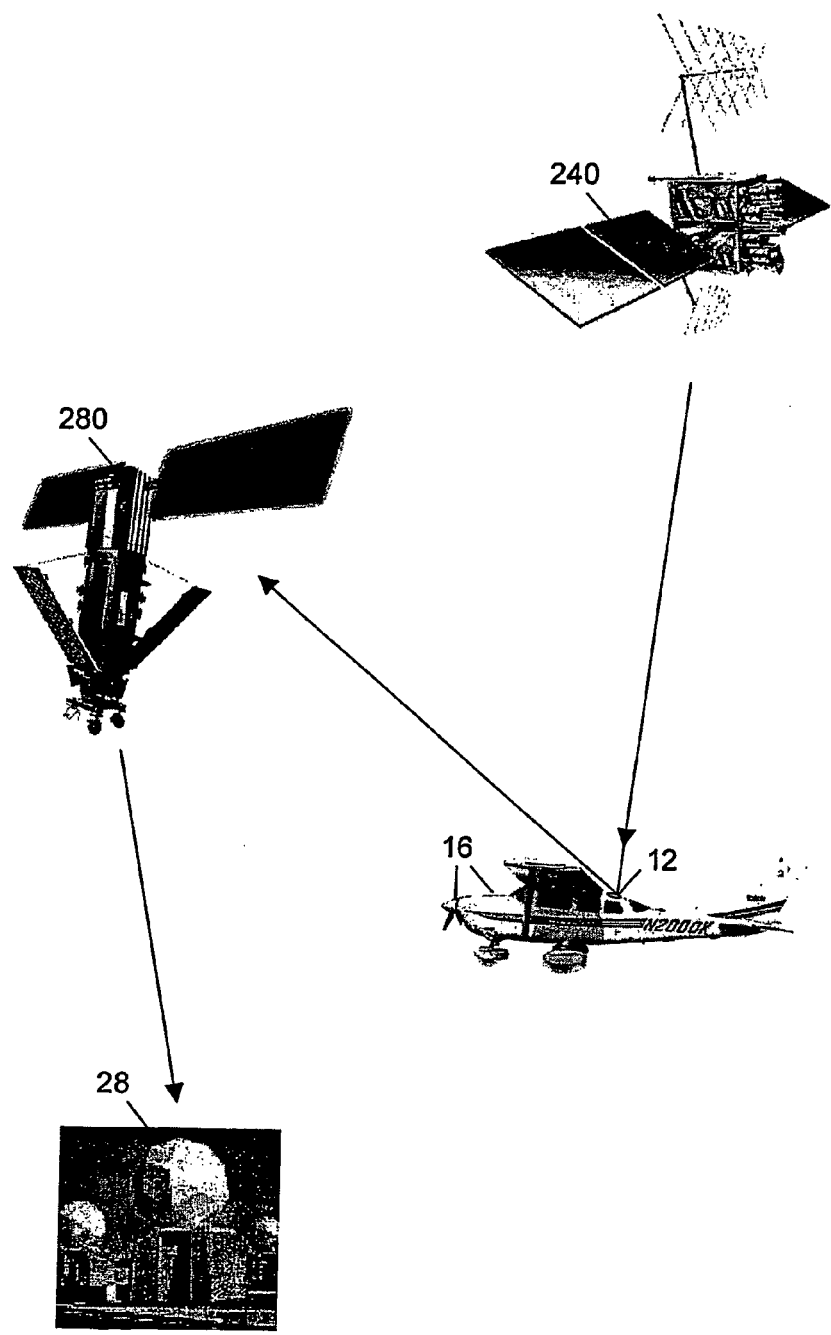
FIG. 6 shows the flow of GPS data in a satellite communication portion of an embodiment of a tracking system.

With reference to FIG. 6, in one embodiment of the tracking system 10, GPS data flows from the GPS satellite 240 to the tracker tag 12 on the asset 16 (e.g., a general aviation aircraft). Data transmissions from the tracker tag data are relayed by the Iridium satellite 280 to the Iridium satellite/PSTN gateway 28.

FIG. 6 particularly notes that the tracker tag sends data to an Iridium satellite which in turn sends this information to a ground station, and further use is shown of GPS satellites providing information to the tracker tag.

Figure 7:
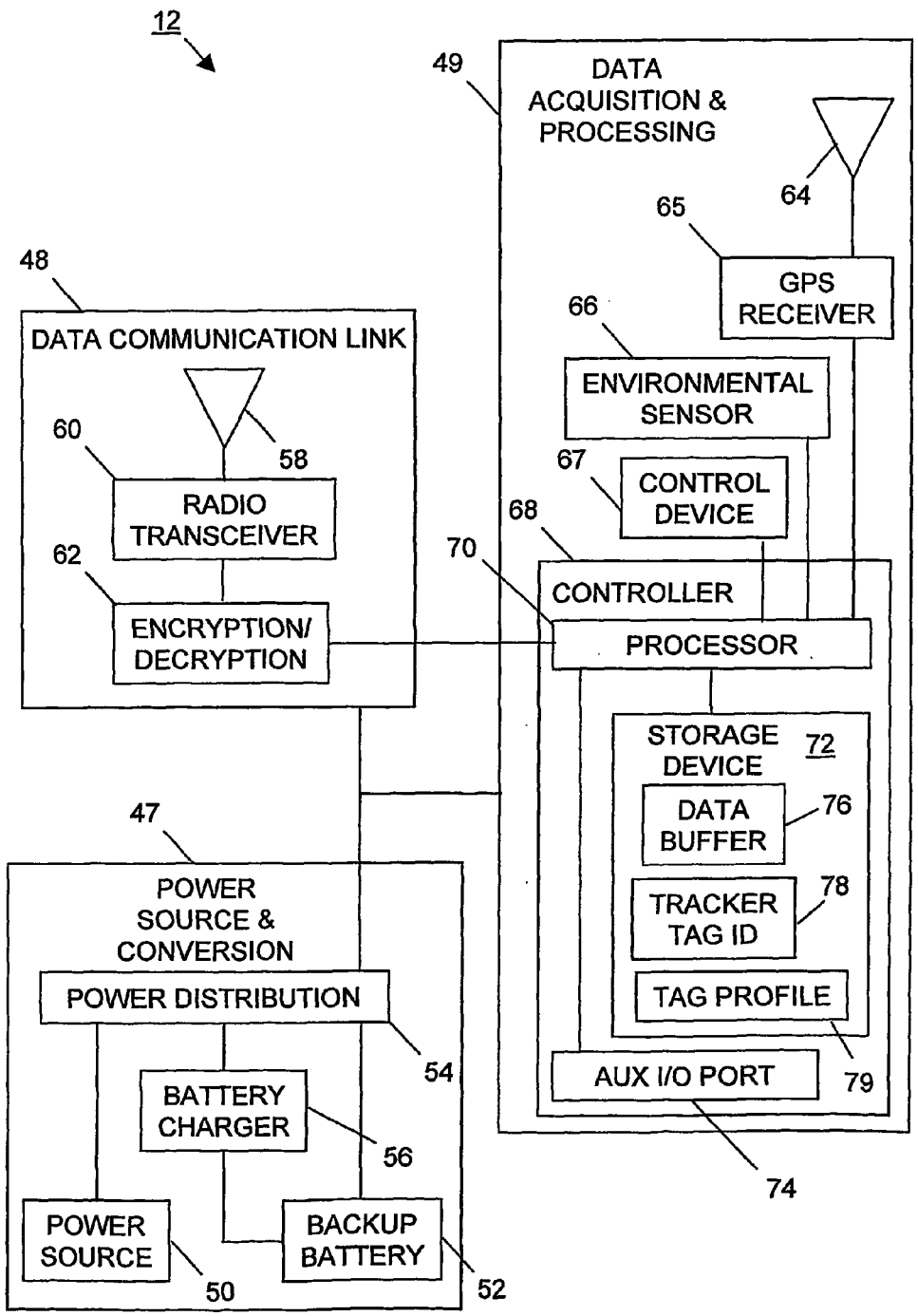
FIG. 7 is a block diagram of an embodiment of a tracker tag.

With reference to FIG. 7, an embodiment of the tracker tag 12 includes a power source and conversion module 47, a data communication link 48, and a data acquisition and processing module 49. The power source and conversion module 47 provides electrical power to the data communication link 48 and the data acquisition and processing module 49. This permits the tracker tag 12 to operate independent of external power sources. The data acquisition and processing module 49 selectively receives position and time data from GPS satellites 240 (FIG. 3) within line of site of the tracker tag 12 and combines the raw GPS position and time data to form combined position and time data and selectively stores the combined position and time data. The data acquisition and processing module 49 selectively communicates the combined position and time data to the data communication link 48. The data communication link 48 selectively transmits the combined position and time data to the tracking information server 14 (FIG. 1) via the data communication network 18 (FIG. 1). The data communication link 48 also receives commands and control information from the tracking information server 14 (FIG. 1).

In the embodiment being described, the power source and conversion module 47 includes a power source 50, a backup battery 52, a power distribution module 54, and a battery charger 56. The power source 50 provides power to the power distribution module 54. The power source 50 may include any combination of a piezoelectric power generator, a solar collector panel 86 (FIG. 8), and a primary battery, as well as other types of suitable power sources. The power distribution module 54 conditions the power so that suitable power is provided to the various components of the tracker tag 12. The power distribution module 54 distributes power to the battery charger 56, data communication link 48, and data acquisition and processing module 49. The battery charger 56 selectively applies charge current to the backup battery 52. For example, when power from the power source is low, the battery charger 56 may not apply the charge current. The backup battery 52 selectively provides power to the power distribution module 54. For example, when power from the power source is suitable, the backup battery 52 may not provide power to the power distribution module 54.

In the embodiment being described, the data communication link 48 includes an RF antenna 58, a radio transceiver 60, and an encryption/decryption process 62. The radio transceiver 60 and RF antenna 58 selectively transmit the combined position and time data to the tracking information server 14 (FIG. 1) via data communication network 18 (FIG. 1). The RF antenna 58 and radio transceiver 60 also receive commands and control information from the tracking information server 14 (FIG. 1). The encryption/decryption process 62 is optional and may encrypt and/or decrypt any type of communication transmitted or received by the tracker tag 12. The encryption/decryption process 62 may encrypt all communications to the tracking information server 14 and decrypt all communications from the tracking information server 14. Alternatively, the encryption/decryption process 62 may be limited to encrypt the combined position and time data transmitted to the tracking information server 14.

In the embodiment being described, the data acquisition and processing module 49 includes a GPS antenna 64, a GPS receiver 65, an environmental sensor 66, a control device 67, and a controller 68. The GPS antenna 64 and GPS receiver 65 selectively receive position and time data from GPS satellites 240 (FIG. 3) within line of site of the tracker tag 12. The controller 68 combines the raw GPS position and time data to form the combined position and time data and selectively stores the combined position and time data. The controller 68 selectively communicates the combined position and time data to the data communication link 48.

The environmental sensor 66 is optional. If implemented, the environmental sensor 66 may include one or more accelerometers. The environmental sensor 66 senses vibration and provides vibration measurements to the controller 68. The controller compares the vibration measurements with predetermined thresholds to detect various types of events. For example, using the vibration measurements, the controller can detect i) startup of a power plant associated with the asset 16 (FIG. 1), ii) shutdown of the power plant, iii) start of movement of the asset, iv) cessation of movement of the asset, v) excessive increase in acceleration of the asset, and vi) excessive decrease in acceleration of the asset. Typically, the controller 68 selectively stores detected event data along with associated combined position and time data. The environmental sensor 66 may also sense other types of environmental conditions.

The controller 68 may use a detected event to determine whether or not the tracker tag 12 should begin receiving the position and time data, begin storing the combined position and time data, and begin transmitting the combined position and time data. For example, the controller 68 can cause the tracker tag 12 to begin receiving position and time data and begin storing combined position and time data when the aircraft takes off, begin transmitting combined position and time data when the aircraft begins to move, stop transmitting after a predetermined period of time, begin transmitting again when the aircraft experiences turbulence, stop transmitting again after a predetermined period of time, stop receiving position and time data when the aircraft stops moving, begin transmitting again when the aircraft stops moving, and stop transmitting when all the stored combined position and time data is transmitted.

The control device 67 is optional and provides for manual startup and shutdown of the tracker tag 12. The control device 67 can be any type of switch or control suitable for its intended purpose. The control device 67 is in communication with the controller 68 and the power source and conversion module 47. Upon a startup activation of the control device 67, the power source 50 is enabled and the controller 68 begins an orderly power up sequence. Upon a shutdown activation, the controller 68 begins an orderly shutdown sequence and, at a suitable time, disables the power source 50.

In the embodiment being described, the controller 68 includes a processor 70, a storage device 72, and an auxiliary input/output (I/O) port 74. The processor is in communication with the GPS receiver 65, environmental sensor 66, control device 67, storage device 72, auxiliary I/O port 74, and data communication link 48. The storage device 72 includes a data buffer 76, a tracker tag identification data 78, and a tag profile 79. The processor 70 receives position and time data from the GPS receiver 65. The processor 70 combines the raw GPS position and time data to form the combined position and time data and selectively stores the combined position and time data in the data buffer 76. The processor 70 selectively communicates the combined position and time data from the data buffer 76 to the data communication link 48.

The processor 70 may include the resolving algorithm described above in reference to FIG. 1. When using the resolving algorithm, the processor 70 may temporarily store the combined position and time data while generating the XYZ or XY data and associated time data. Once the XYZ or XY data and associated time data is generated it is stored in the data buffer 70 and the corresponding raw GPS position and time data is purged. The combined position and time data communicated to the data communication link 48 includes the XYZ or XY data and associated time data instead of the raw GPS position and time data.

The processor 70 detects the events associated with vibration measurements described above. The processor 70 may use the XYZ or XY data to detect additional events related to the position of the asset. The processor 70 compares the XYZ or XY data to predetermined XYZ or XY coordinate limits to detect certain events. For example, the processor 70 may detect when the asset is i) in the proximity of a restricted area, ii) in a restricted area, iii) in the proximity of a hazardous area, iv) in a hazardous area, v) at a way point, vi) at a destination, vii) off course, viii) nearing a high stress condition, ix) experiencing a high stress condition, x) experiencing excessive loss of altitude, xi) experiencing excessive increase in altitude, xii) experiencing unexpected stoppage or significant slow down, or xiii) exceeding a speed restriction. Additional types of detected events are also possible.

Typically, the processor 70 selectively stores detected event data along with associated combined position and time data. Like detected events associated with vibration, the processor 70 may use any of the detected events associated with position and time to determine whether or not the tracker tag 12 should begin receiving the position and time data, storing the combined position and time data, and transmitting the combined position and time data. Additionally, any type of detected event can be included in the tracking information provided to the subscriber/client user at the monitoring device 22 (FIG. 1).

The processor 70 receives command and control information from the data communication link 48. The information stored in the tag profile 79 may be predetermined and may be provided in control information. Alternatively, the tag profile 79 may be predetermined and permanently resident in the storage device 72. In another alternative, the tag profile 70, or certain information within the tag profile 70, may be configured and/or edited during operation of the tracker tag 12.

The processor 70 manages data transmissions to the tracking information server 14 (FIG. 1) by controlling when the combined position and time data is communicated from the data buffer 76 to the data communication link 48. Typically, the processor 70 controls data transmissions in a burst fashion by waiting for a group of the combined position and time data to accumulate in the data buffer 76. This may be based on commands, control information, and/or the tag profile 79. The processor 70 encodes each transmission burst with tracker tag identification data 78 so that the tracking information server 14 can associate the data transmitted with the appropriate tracker tag 12. Event data is typically stored in the data buffer 76. A transmission burst may also include event data associated with the combined position and time data contained in the burst.

In one embodiment, the processor controls the timing between transmission bursts to maintain a virtual private network (VPN) connection over a public data communication system within the data communication network 18 (FIG. 1). For example, the public data communication system may be the Iridium satellite system, a similar satellite system, or any type of wireless telephone system that provides for VPNs. The processor 70 may control the timing between transmission bursts so that the tracking system 10 (FIG. 1) can provide real-time tracking information. Alternatively, the processor 70 may control the timing to minimize transmission time over the data communication network. Thus, minimizing communication costs for public telephone networks or other carriers that charge for connect time. As another alternative, the processor 70 may delay transmission bursts until a begin transmitting command is received via the data communication network. Typically, the processor 70 maintains the combined position and time data in the data buffer associated with each transmission burst until an acknowledgment of receipt of the transmission burst is received via the data communication network 18 (FIG. 1).

The auxiliary I/O port 74 is optional and provides a port for directly connecting a computer device to the tracker tag 12. The computer device, for example, can be used to perform tracker tag maintenance or to download combined position and time data from the data buffer 76. The computer device may be a personal computer, a notebook computer, a personal digital assistance, or a similar device.

Figure 8:
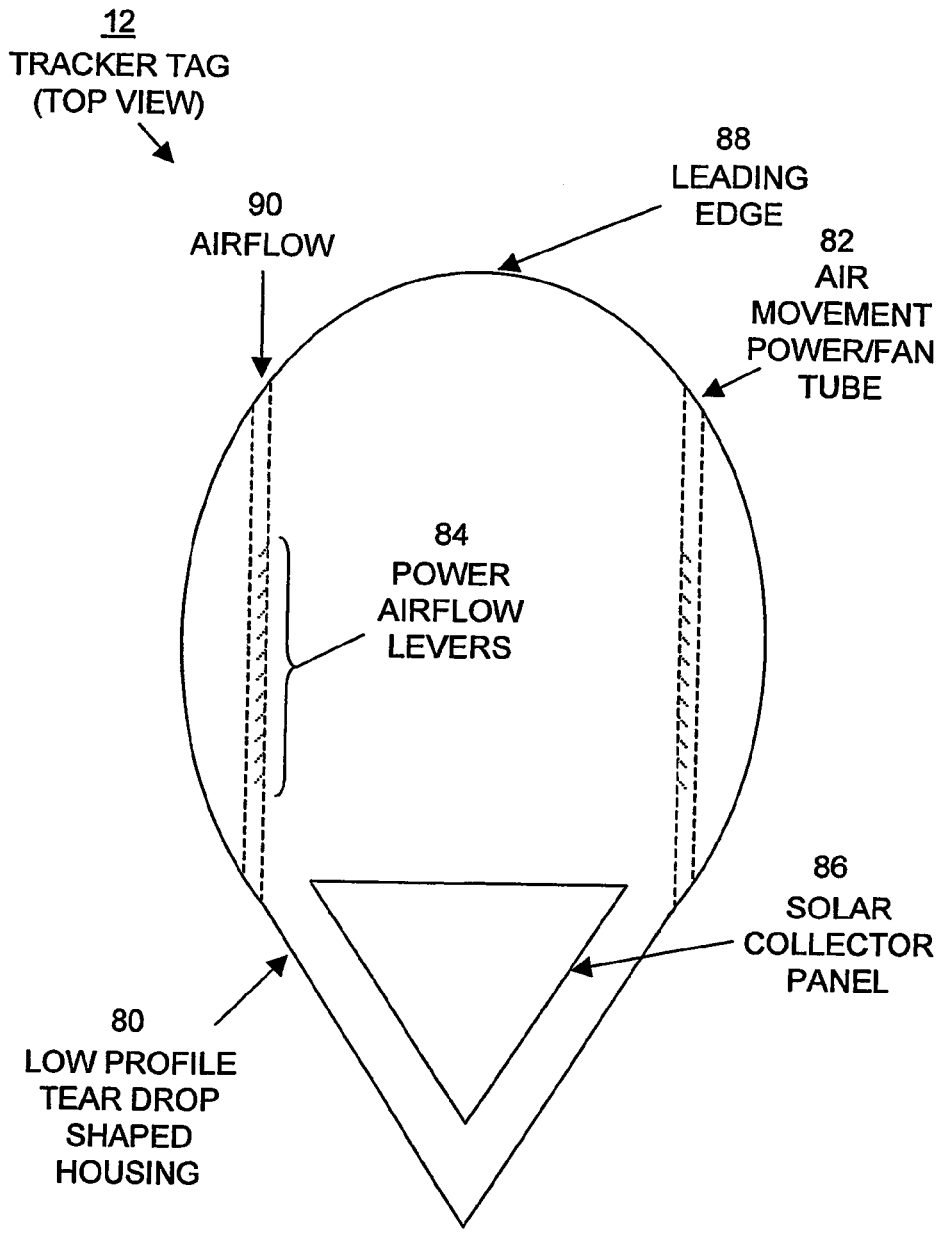
FIGS. 8–10 provide top and side views of an embodiment of a tracker tag.
Figure 9:
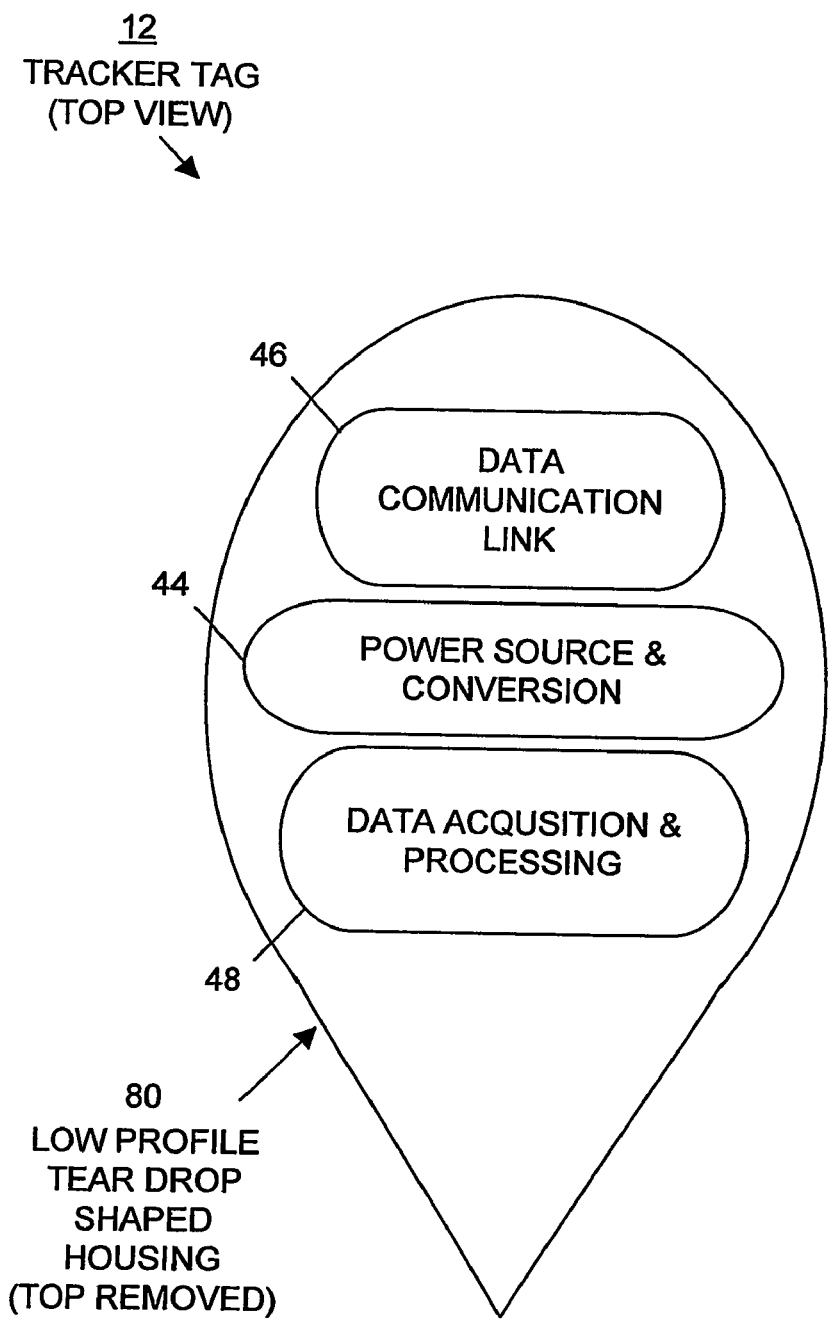
Figure 10:
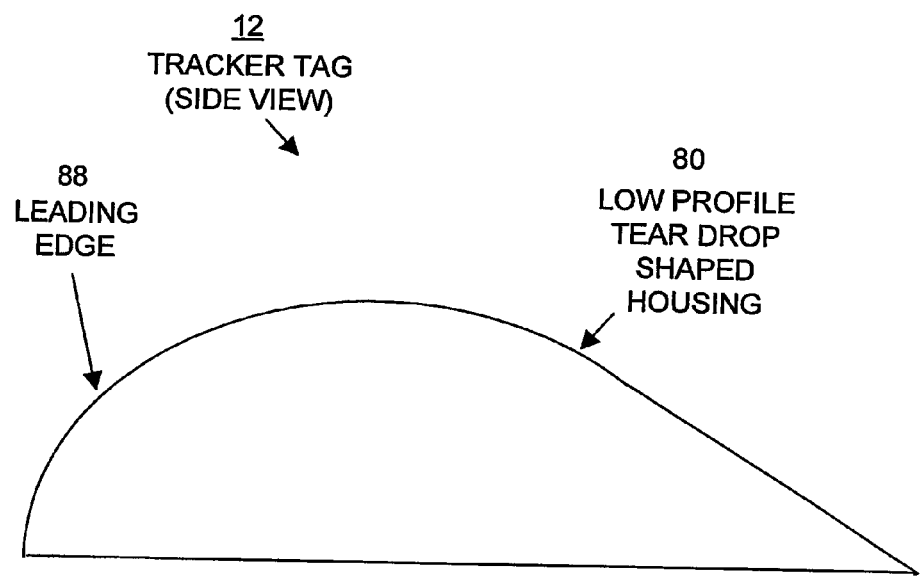

With reference to FIG. 8-10, one embodiment of the tracker tag 12 has a teardrop-shaped housing 80. Two air movement power/fan tubes 82 with power airflow levers 84 inside a portion of the tubes are provided in the housing 80. A solar collector panel 86 is secured to the top of the housing 80. The power airflow levers 84 and the solar collector panel 86 generate power and act as supplemental power sources (FIG. 50). Airflow 90 perpendicular to the leading edge 88 of the tracker tag 12 activates the power airflow levers 84 to generate electrical power. The solar collector panel 86 generates electrical power from light.

With reference to FIG. 9, for the embodiment being described, the power source and conversion module 47, data communication link 48, and data acquisition and processing module 49 are shown with the top of the housing 80 removed.

In FIGS. 8 and 9, illustrated is one embodiment of a tracker tag according to the concepts of the invention. As previously noted, since this tracker tag is entirely independent from the power source of the aircraft, ground vehicle or watercraft, various power generating mechanisms are provided unto the tracker tag itself. For example, tracker tag 12 will include airflow technology having an air movement power/fan tube 82 and power air flow levers 84. As air flow 90 enters the tube, electrical power is generated. For additional power source, a solar collector panel 86 is also provided on the tracker tag. A backup battery 52 (FIG. 7) is interconnected with the power source and conversion module 47 (FIG. 7) within the tracker tag 12 to insure a constant operation of the tracker tag. The battery may be selectively recharged by one of the alterative power sources. To provide the communication from the tracker tag on the aircraft, ground vehicle or watercraft to a tracking information server 14 (FIG. 1) or other appropriate location such as through the Internet, the tracking system also includes a multidirectional transmission and reception antenna and a radio-GPS receiver and RF two-way radio system package. It is also noted that this embodiment forms the tracker tag 12 with a low profile tear-shaped design in order to cut down on wind resistance.

With reference to FIG. 10, for the embodiment being described, the aerodynamic nature of the teardrop-shaped housing 80 is shown in a side view. As shown, the leading edge 88 is on the left.

FIG. 10 illustrates the side profile of the tracker tag 12 placed on the fuselage. As larger overall picture showing the mounting of tracker tag 12 on an aircraft is also illustrated in FIG. 6. As can be noted from these figures, the tracker tag 12 is physically and electrically isolated from the internal systems of the aircraft. This insures independence of the tracker tag at all times.

It is further noted that, while the tracker tag is shown in this embodiment in a low profile tear-drop shape, other aerodynamic designs may also be appropriate. Further, while the power generation has been illustrated as an air mount power fan tube and the solar collector panel, as well as the backup battery, it is to be appreciated that other forms of energy generation mechanisms may also be implemented. For example, but not limiting the discussion, one may also use fuel cells, hydrogen cells, turbine technology, fly wheel technology and still other power generation arrangements in order to insure the reliable operation of tracker tag 12. Additionally, the tracker tag 12 may be attached to a ground vehicle or a watercraft.

Figure 11:
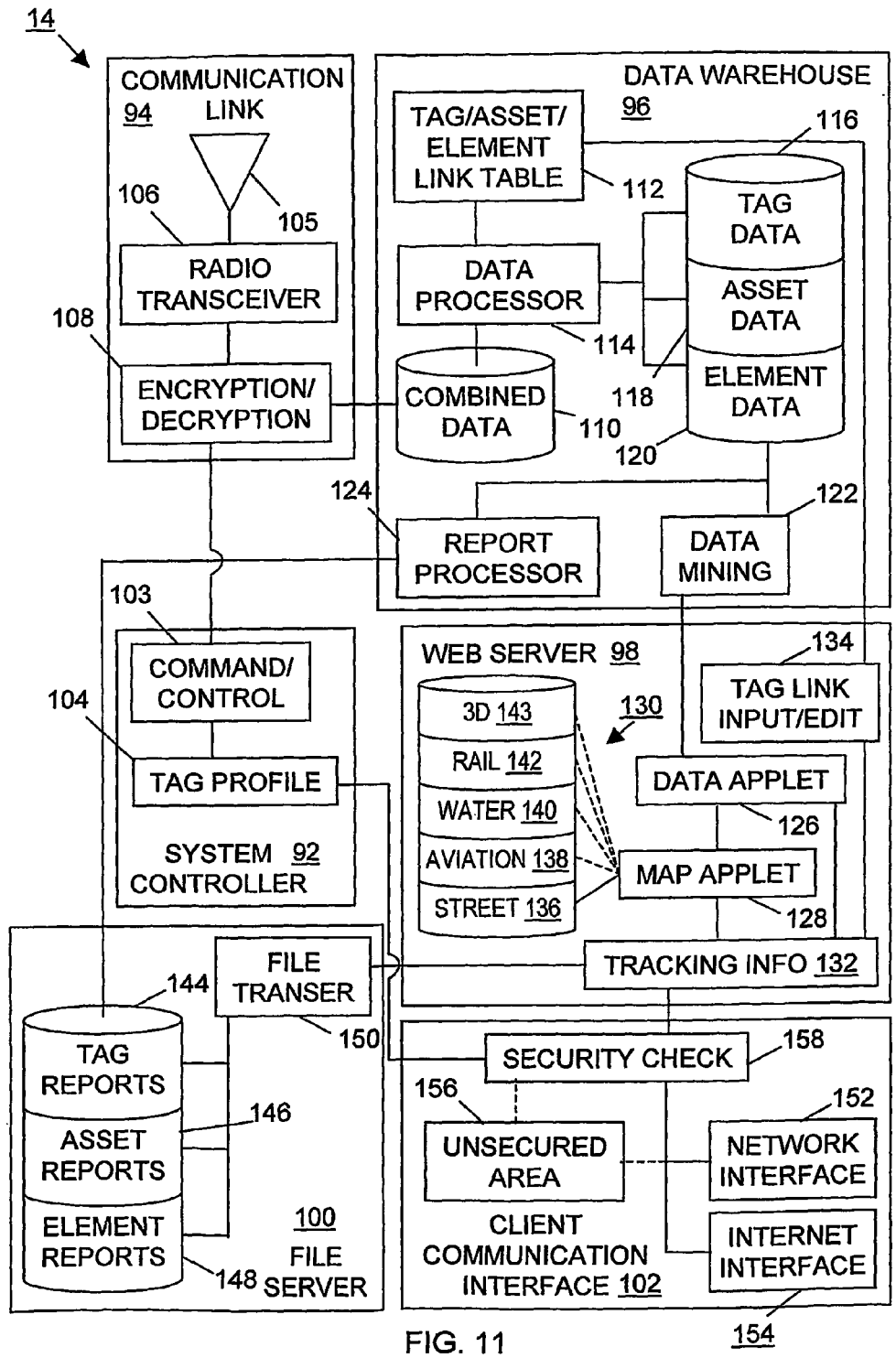
FIG. 11 is a block diagram of an embodiment of a tracking information server.

With reference to FIG. 11, an embodiment of the tracking information server 14 includes a system controller 92, a communication link 94, a data warehouse 96, a Web server 98, a file server 100, and a client communication interface 102. The communication link 94 selectively provides command and control information to the tracker tag 12 (FIG. 1) and receives the combined position and time data from the tracker tag 12. The data warehouse 96 selectively processes the combined position and time data to form tag data, asset data, and/or element data.

The Web server 98 includes a set of Web pages for displaying tracking information. The Web server 98, in conjunction with the data warehouse 96 mining the tag data, asset data, and/or element data, selectively populates one or more of the Web pages with certain tracking information for monitoring movement of the asset 16 (FIG. 1). The Web server 98, in conjunction with the client communication interface 102, selectively makes the tracking information accessible to an authorized user of the monitoring device 22 (FIG. 1) via the tracking information network 20 (FIG. 1).

The data warehouse 96 may also process the tag data, asset data, and/or element data into tag reports, asset reports, and/or element reports. If report processing is implemented, the tag reports, asset reports, and/or element reports are stored on the file server 100. The Web server 98, in conjunction with the file server 100 and the client communication interface 102, selectively makes the tag reports, asset reports, and/or element reports accessible to an authorized user of the monitoring device 22 (FIG. 1) via the tracking information network 20 (FIG. 1).

The Web server 98, in conjunction with the client communication interface 102, may selectively receive links between tracker tag identification data and assets, as well as associated link information, from an authorized user of the monitoring device 22 (FIG. 1). Likewise, the Web server 98 may selectively receive links between an asset and elements associated with the asset, as well as associated link information, from an authorized user. The data warehouse 96 stores the links and link information collected by the Web server 98 for use during generation of asset data and element data.

The system controller 92 provides overall control of the tracking information server 14 and, in conjunction with the communication link 94, control of the tracker tag 12. Overall control may be based on preprogrammed instructions and the tag profile are stored in the system controller 92. The preprogrammed instructions includes commands and control information. The tag profile includes control information, as described above. The system controller 92, in conjunction with the client communication interface 102, may selectively receive command and control information from an authorized user of the monitoring device 22 (FIG. 1) to configure and/or edit the preprogrammed instructions and/or the tag profile.

In the embodiment being described, the system controller 92 includes a command and control module 103 and a tag profile 104. The command and control module 103 processes preprogrammed instructions for overall control of the tracking information server 14 and, in conjunction with the communication link 94 and the data communication network 18 (FIG. 1), control of the tracker tag 12 (FIG. 1) by communicating commands and control information. Certain parts of overall control may be based on the tag profile 104. The information stored in the tag profile 104 may be predetermined and may be provided in control information. Alternatively, the tag profile 104 may be predetermined and permanently resident. In another alternative, the tag profile 104, or certain information within the tag profile 104, may be configured and/or edited during operation of the tracking information server 14 and associated tracker tag 12 (FIG. 1).

In the embodiment being described, the communication link 94 includes an RF antenna 105, a radio transceiver 106, and an encryption/decryption process 108. The RF antenna 105 and radio transceiver 106 and selectively receive the combined position and time data from the tracker tag 12 (FIG. 1) via data communication network 18 (FIG. 1). The radio transceiver 106 and RF antenna 105 also transmit commands and control information to the tracker tag 12 (FIG. 1). The encryption/decryption process 108 is optional and may encrypt and/or decrypt any type of communication transmitted or received by the tracking information server 14. The encryption/decryption process 108 may encrypt all communications to the tracker tag 12 and decrypt all communications from the tracker tag 12. Alternatively, the encryption/decryption process 108 may be limited to decrypt the combined position and time data received from the tracker tag 12.

In the embodiment being described, the data warehouse 96 includes a combined position and time storage area 110, a tag/asset/element link table 112, a data processor 114, a tag data storage area 116, an asset data storage area 118, an element data storage area 120, a data mining process 122, and a report processor 124. The combined position and time storage area 110 receives the combined position and time data from the tracker tag (FIG. 1) via the communication link 94.

The tag/asset/link table 112 stores the links and link information collected by the Web server 98. The link from the tracker tag 12 to the asset 14 allows the data processor 114 to associate the combined position and time data with the asset so that asset data may be generated. Similarly, the link from the asset 14 to an element of the asset allows the data processor 114 to associate the combined position and time data with the element so that element data may be generated. Link information is descriptive information that may be associated with an asset or an element. The link information is accessible to the report processor during generation of the asset and element data.

The data processor 114 may include a data decompression process to decompress compressed combined position and time data transmissions. If the combined position and time data does not include XYZ or XY data, the tracking information server 14 includes the algorithm to resolve position and time data for the associated tracker tag 12 from raw GPS position and time data described above in reference to FIG. 1. The algorithm generates XYZ data representing latitude, longitude, and altitude (requiring position and time data from at least four GPS satellites) or XY data representing latitude and longitude (requiring position and time data from at least three GPS satellites) in the same manner as described above if the resolving algorithm is performed in the tracker tag 12. The algorithm also generates time data associated with XYZ or XY data.

Whether or not the data processor 114 calculates the XYZ or XY data, the data processor 114 may use the XYZ or XY data to detect events related to the position of the asset. The data processor 114 compares the XYZ or XY data to predetermined XYZ or XY coordinate limits to detect certain events. The types of events that can be detected by the data processor 114 based on position include the same examples listed above for the tracker tag 12. Of course, additional types of detected events are also possible. Typically, the detected events are communicated to the system controller 92 so that the system controller 92 can communicate suitable commands in response to the detected event. Typically, the data processor 114 selectively stores detected event data along with associated combined position and time data.

The data processor 114 selectively processes the combined position and time data, detected event data, and link information based on control information from the controller (i.e., preprogrammed instructions and tag profile 104), links from the tag/asset/element link table, and detected events to form tag data, asset data, and/or element data. The tag data is stored in the tag data storage area 116. The asset data is stored in the asset data storage area 118. The element data is stored in the element data storage area 120. The data mining process 122 mines the tag data, asset data, and/or element data based on data required by the Web server 98 to populate one or more of the Web pages with tracking information.

The report processor 124 is optional. If report processing is implemented, the report processor 124 selectively processes the tag data into tag reports, the asset data into asset reports, and the element data into element reports. The report processor 124 communicates the tag, asset, and element reports to the file server 100 for storage. For example, the tag reports may include: i) raw GPS position and time data, ii) XYZ position and time data, and iii) detected event data. Other type of tag reports are also possible. For example, the types of asset reports may include: i) asset log, ii) operation log, iii) operator log, iv) location and time in restricted area, v) location and time in hazardous area, vi) location and time off course, v) location and time in high stress condition, and vi) location and time of unexpected stoppage. Other types of asset reports are also possible. For example, the types of element reports may include: i) element log, ii) operation log, iii) operator log, iv) location and time in restricted area, v) location and time in hazardous area, vi) location and time off course, v) location and time in high stress condition, and vi) location and time of unexpected stoppage. Other types of element reports are also possible.

Notably, if the asset is an aircraft, the asset log available from the tracking information server 14 may be tailored to replace the traditional aircraft log. Similarly, the operation log may be tailored to replace the traditional flight operation log and the operator log may be tailored to replace the traditional pilot log. Another aircraft report could identify the number of hours the aircraft has been above 14,000 feet or pressurized. Moreover, if the element is a fuel pump on an aircraft engine, a location and time in high stress condition report can identify the total number of hours the engine has been exposed to high pressure conditions. Another fuel pump report could identify takeoffs and/or landings and associated conditions.

In the embodiment being described, the Web server 98 includes a data applet 126, a map applet 128, a map storage area 130, a tracking information module 132, and a tag/asset/element link input/edit module 134. The tracking information module 132 includes the set of Web pages. The tracking information module 132 presents tracking information to an authorized client user at a monitoring device 22 (FIG. 1) via the Web pages in response to client user selections and requests presented via one or more of the Web pages.

The map applet 128 and data applet 126 are web-based programs that respond to selections and requests by an authorized client user. Typically, the tracking information module 132 typically presents tracking information via a map retrieved from the map storage area 130, supplemental graphics overlaid on the map by the map applet 128 and supplemental text provided by the data applet 126. The map may be any map that is suitable for type of asset being track. For example, the map storage area 130 may include one or more of a street map 136, an aviation map 138, a water map 140, a rail map 142, and a three-dimensional (3D) environment. Other types of maps may also be provided.

The map applet 128 may default to providing the aviation map 138 to an appropriate Web page for tracking an aircraft. The Web page may permit the client user to select a different map. If the client user selects a different map, the map applet 128 changes the Web page to the display the selected map. Similarly, the data applet 126 may retrieve certain tag, asset, and/or element data from the data warehouse 96 and provide it to a given Web page by default. The Web page may permit the client user to select additional or different tracking information. If so, the data applet 126 responds to client user selections and requests accordingly.

In conjunction with the map and textual position and time tracking information, the data applet 126 retrieves XYZ or XY position and time data from the data warehouse 96. The XYZ or XY position data is provided to the map applet 128 and the tracking information module 132. The map applet 128 generates an icon representing the XYZ or XY position on the map and overlays it on the map display provided to the tracking information module 132. Multiple types of icons may be used, as well as coloring, flashing, and other suitable attributes of the icon, to symbolize certain conditions associated with the asset. Of course, many other features that can be incorporated in Web pages can also be implemented to provide the tracking information.

Figure 12:
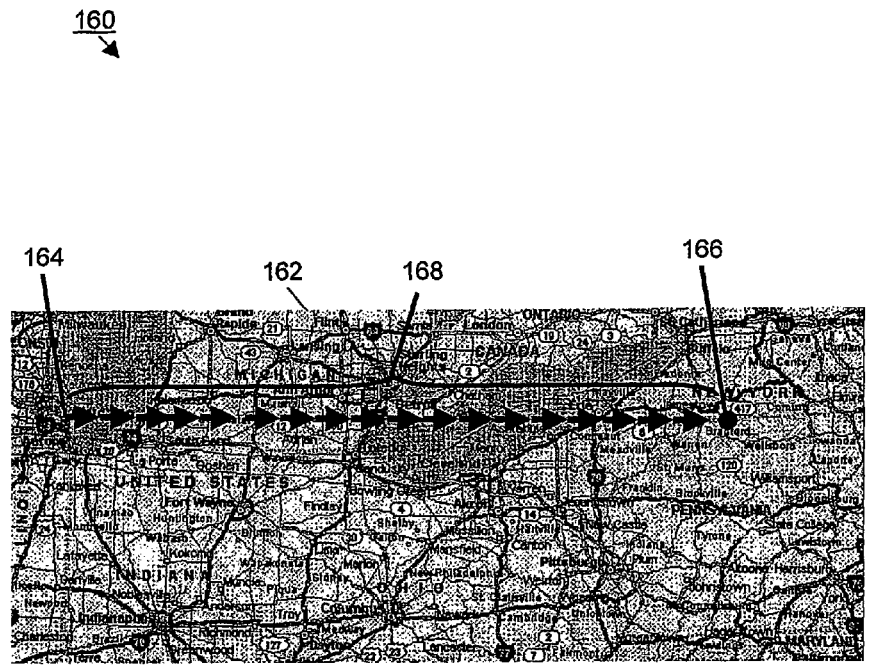
FIG. 12 illustrates an example of a portion of a monitoring device display showing a street map and tracking information in accordance with one aspect of the invention.

A sample map with several types of overlaid icons is provided in FIG. 12. While FIG. 12, does not include textual information, the XYZ or XY position and time can also be overlaid on the map at a suitable location. Morever, icons and data for additional assets can be overlaid on the map for tracking, for example, a fleet of aircraft or all airborne aircraft. The tracking information module 132 typically permits panning and zooming of the map display so that the client user can adjust the display to a particular preference.

The Web server 98 typically includes one or more Web pages that permit an authorized user to configure links and link information. The tag link input/edit module 134 works in conjunction with the one or more Web pages to collect the link and link information and communicate it to the data warehouse 96. The Web server 98 also typically includes Web pages that permit an authorized user to configure the tag profile 104.

Within the set of Web pages, the client user typically has access to textual information providing an audit trail for a particular tag, asset, and/or element. Notably, the concept of linking assets to tracker tags and elements to assets has the advantage of accumulating historical data for assets and elements that goes across different tracker tags and different assets. For example, if a tracker tag on an aircraft is replaced for any reason, the link between the asset and tracker tag is updated and the asset data for the aircraft includes data provided by the initial tracker tag and data provided by the new tracker tag. Thus, historical tracking information and reports for the aircraft can be comprehensive. Similarly, if a fuel pump for an aircraft engine happens to be removed from one aircraft and installed on another aircraft, the element data for the fuel pump is comprehensive as long as the link between the element and asset is updated.

In the embodiment being described, the file server 100 and includes a tag reports storage area 144, an asset reports storage area 146, an element reports storage area 148, and a file transfer module 150. The file transfer module 150 retrieves tag, asset, and/or element reports from the storage in responds to requests for reports from the Web server 98. Typically, this is in response to selections or requests from the client user via a Web page.

In the embodiment being described, the client communication interface 102 includes a network interface 152, an Internet interface 154, an unsecured area 156, and a security check 158. The network interface 152 provides a standard interface to a communication network in the tracking information network. For example, the network interface 152 may connect to a LAN, wireless LAN, terrestrial telephone network, satellite system, or any other suitable communication network. The Internet interface 154 provides any type of standard interface to the Internet. Other suitable interfaces to the tracking information server 14 are also possible. Preferably, the monitoring device 22 accesses the tracking information server via the Internet interface 154.

The unsecured area 156 does not provide tracking information. This area requires the client user to perform a login sequence. The login information is provided to the security check 158 to determine whether or not the client user is authorized to enter the Web server for monitoring tracking information, to configure the tag profile 104, or configure links and link information. The unsecured area 156 may be Web-based and may contain information describing the tracking system and/or tracking services.

With reference to FIG. 12, an example of a portion of a monitoring device 22 (FIG. 1) display shows a street map 162. An aircraft departing from Chicago, Ill. 164 and arriving in Jamestown, N.Y. 166. The tracking information 168 is shown by the sequence of arrows pointing from Chicago to Jamestown.

FIG. 12 illustrates a map showing a portion of the United States wherein the arrows from Chicago to Jamestown, N.Y. illustrate the path which would be visually shown to a user having access to the tracking system. This would allow the user to constantly track the progress of the flight or ground vehicle of interest. It is also possible to provide such map tracking of watercraft.

Figure 13:
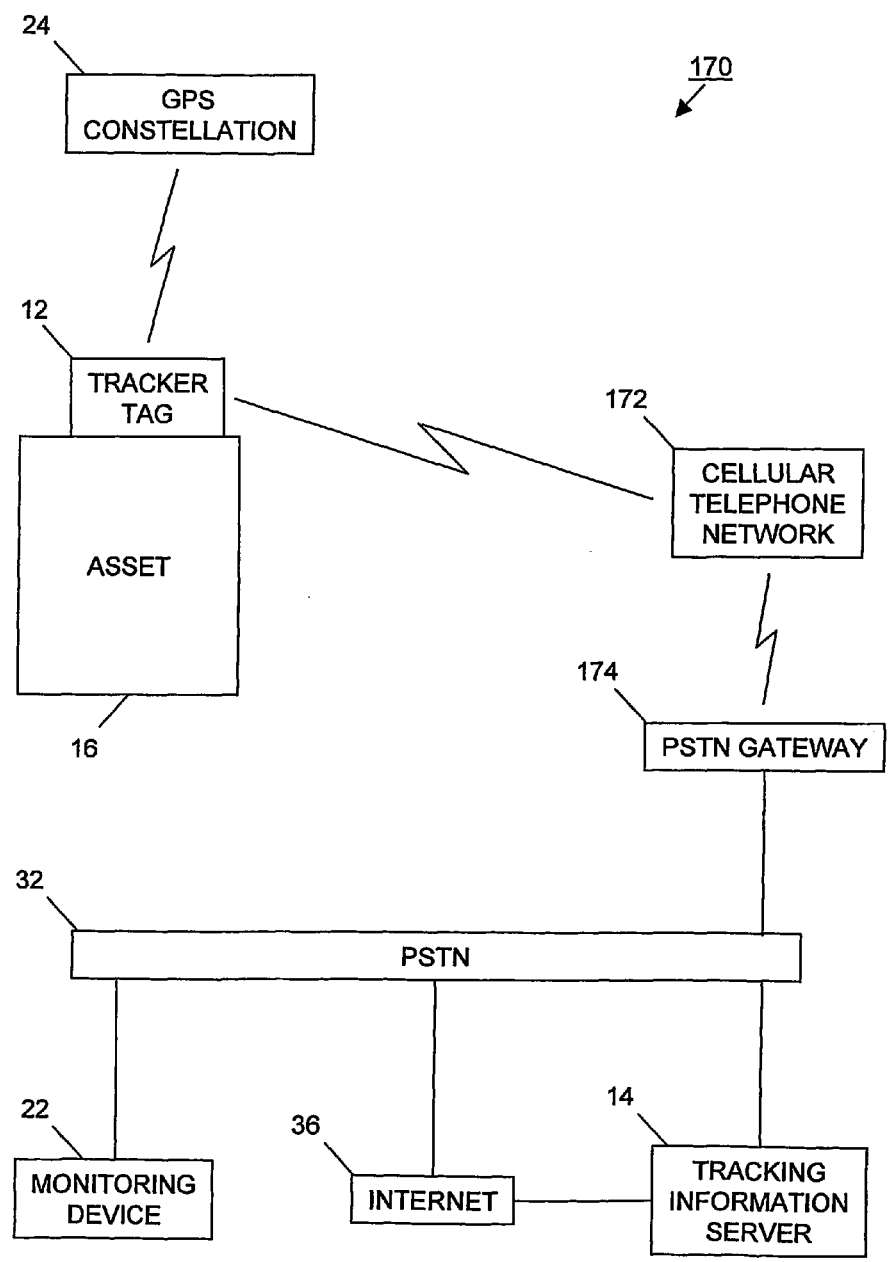
FIG. 13 is a block diagram of an embodiment of a regional tracking system incorporating the invention.

With reference to FIG. 13, an embodiment of a regional tracking system 170 includes the tracker tag 12, the tracking information server 14, the asset 16, the monitoring device 22, the GPS satellite constellation 24, the PSTN 32, the Internet 36, a cellular telephone network 172, and a cellular telephone/PSTN gateway 174. The tracker tag 12, tracking information server 14, asset 16, monitoring device 22, and GPS satellite constellation 24 are as described above in reference to FIG. 1.

A regional implementation of the tracking system 170 is provided by a data communication network 18 (FIG. 1) and a tracking information network 20 (FIG. 1) that provide regional coverage (i.e., regional communications). The data communication network 18 (FIG. 1) is provided by a wireless terrestrial telephone system and a land line terrestrial telephone network. The preferred wireless terrestrial telephone system is a cellular telephone system. However, other wireless terrestrial telephone systems that provide regional coverage may be implemented. The preferred terrestrial telephone network is the PSTN. However, other types of terrestrial telephone networks may be implemented. More specifically, the data communication network 18 (FIG. 1) is provided by the cellular telephone network 172, the cellular telephone/PSTN gateway 174, and the PSTN 32.

In the embodiment being described, the tracking information network 20 (FIG. 1) is provided by a terrestrial telephone system and the Internet 36. As shown, the preferred terrestrial telephone system is a land line telephone system. However, other terrestrial telephone systems that provide regional coverage may also be implemented in the regional tracking system 170. More specifically, the tracking information network 20 (FIG. 1) is provided by the PSTN 32 and the Internet 36.

Figure 14:
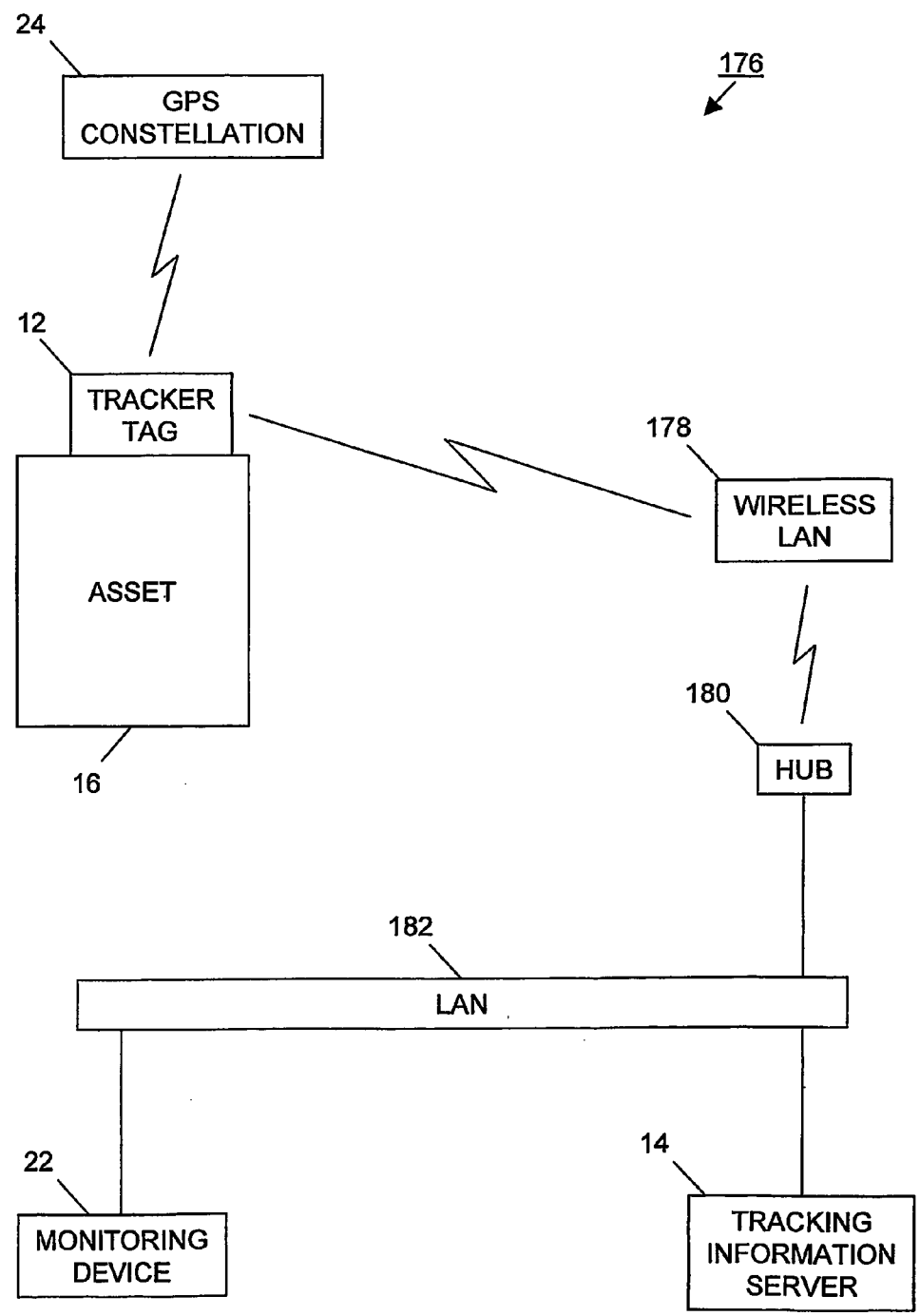
FIG. 14 is a block diagram of an embodiment of a local tracking system incorporating the invention.

With reference to FIG. 14, an embodiment of a local tracking system 176 includes the tracker tag 12, the tracking information server 14, the asset 16, the monitoring device 22, the GPS satellite constellation 24, a wireless LAN 178, a wireless LAN/LAN hub 180, and a LAN 182. The tracker tag 12, tracking information server 14, asset 16, monitoring device 22, and GPS satellite constellation 24 are as described above in reference to FIG. 1.

A local implementation of the tracking system 170 is provided by a data communication network 18 (FIG. 1) and a tracking information network 20 (FIG. 1) that provide local coverage (i.e., regional communications). The data communication network 18 (FIG. 1) is provided by the wireless LAN 178, wireless/wire line LAN hub 180, and wire line LAN 182. However, other local networks suitable for handling wireless data communication are also possible. The tracking information network 20 (FIG. 1) is provided by the wire line LAN 182. However, other local networks suitable for handling data communication are also possible.

In one embodiment of the invention, the tracker tag 12 (FIG. 1) includes a two-way radio and is operatively associated with an aircraft. The tracker tag receives data transmissions from the GPS satellites. A position of the aircraft can be determined from the GPS data. In addition, the tracker tag has the capacity to send and receive data and/or commands from a tracking information server 14 (FIG. 1) transmitting and receiving radio signals at least partially via the Iridium satellite system. The tracker tag is preferably mounted on a high side of a wing or fuselage of an aircraft. For other modes of transportation, such as automobiles, trucks, boats and trains, the tracker tag is preferably mounted on the high side of these vehicles and craft to permit a line of sight to the sky. The tracker tag receives the GPS data from GPS satellites orbiting at high earth orbit and determines a position of the tracker tag in XYZ coordinates (X being latitude, Y being longitude and Z being altitude).

Additionally, the tracker tag includes a radio transmitter and radio receiver that can transmit the XYZ location in preprogrammed tasks to communicate the position of the tracker tag to other orbiting satellites, for example, the Iridium satellite group, orbiting in low earth orbit. In essence, the tracker tag and the systems to support the function receive query pings from the ground (i.e., tracking system server 14 (FIG. 1)) and have the tracker tag receive the ping and then trigger a character string to be transmitted to the communication satellite systems to report the XYZ location in real-time. Repeated pings will be responded to with repeated XYZ locations to a high degree of accuracy, on the order of 18 inches of reliable accuracy. If the preprogrammed task is to constantly report location, the tracker tag will, in preprogrammed sequence, report the constant location of the tracker tag and thus the location of the aircraft, ground vehicle or watercraft.

These radio signals or data are translated as a coordinated point that is projected on template maps and charts as an icon representative of the particular tracker tag. For example, the tracker tag will include a unique number and identifier for the aircraft, ground vehicle and/or watercraft.

Encryption and data compression techniques will maintain the security of the system while at the same time giving access to subscribed users and/or authorized entities to receive "Tracker" information. Again, by using widely available and reliable technology, such as employed with pagers, cell phones, PDA computers and the Internet, this information can be effectively transmitted and received with a desired level of security.

The tracker tag and the supporting systems provide the location of any general aviation aircraft, ground vehicle, or watercraft, worldwide, as long as the tracker tag has line of sight to the sky. If line of sight to the sky is lost, the "Tracker" data would reflect the last position that the tracker tag was exposed to line of sight, for example, in front of the hanger where the aircraft, ground vehicle, or watercraft is stored. The "Tracker" data reflects any movement and location in real-time of any aircraft, ground vehicle, or watercraft equipped with the "Tracker" and supporting system.

In one embodiment, it is intended that a tracker tag be placed on every general aviation aircraft prior to take-off and the unique number of the tracker tag attached to the aircraft would be included in any flight plan and reporting of any flight condition associated with the aircraft.

The tracker tag preferably comprises three main subsystems that, when assembled in a system, provide the ability to track the position and performance of an aircraft, ground vehicle, or watercraft anywhere in the world. The sub-systems are broken down into the following:

1. Power generation and conversion 47 (FIG. 7),
2. Data acquisition and processing 49 (FIG. 7), and
3. Data communication link 48 (FIG. 7).

The tracker tag is small enough to be attached directly to the top of the aircraft fuselage, ground vehicle or watercraft and is intended to be non-intrusive to any of the electrical and/or mechanical systems of these modes of transportation.

The tracker tag autonomously collects and processes all data as it pertains to the aircraft, ground vehicle, or watercraft and its operating parameters. A fully integrated GPS receiver 65 (FIG. 7) provides positional information so that exact operational parameters are collected. Data is stored within the tracker tag for interrogation through several means. The tracker tag has the provisions to transfer the data at a prescribed maintenance interval by direct contact with the tracking information server, or the data may be collected in real-time through one of several remote wireless interfaces. These interfaces allow wide or local area connectivity.

In summary, some of the salient features that are part of this invention are as follows: differing from the art of the past, the tracker tag is a device that can be integrated into a larger system due to its low profile, service life, power supply (solar, piezoelectric power generation and backup battery), the ability to withstand extreme conditions of operation (−40° C. to a high end of +85° C.) and effectiveness at all altitudes.

The tracker tag is capable of receiving GPS data and responding and/or reporting location and other data using paging technology through a communication satellite. These communications will be enabled to display location on a video template, such as a map or a chart, that can be displayed using a standard personal computer, a pager device, a video display cell phone or a Web-enabled video PDA computer. It is presently contemplated that the system would use a Web site dedicated to display the exact location of the tracker tag anywhere in the world in the XYZ coordinates on a map/chart (provided the tracker tag has "line of sight" to the sky and communications (i.e., receiving and transmitting RF) are not impeded).

The tracking system, advantageously and seamlessly, integrates the GPS system, Iridium satellite system, ground-based telecommunication systems, and the Internet for communications and current "state-of-the-art" database storage (preferably systems that individually are in place and commercialized) in a manner that provides state of the art location in real time. The system allows users/subscribers to have access to exact location in real-time using commonly used personal computers or any data-capable display device through Internet access.

Flight data collection techniques for vibration, locations and reporting data accumulated in real-time (or as required by preprogrammed tasking) can also be incorporated into the system. For example, vibration data recording, for accumulating empirical data to predict fuel pump condition and reliability, can be collected and analyzed for servicing decisions. Similarly, the tracking tag can integrate a GPS and environmental sensing techniques through the use of an accelerometer or another type of vibration sensor. The power generation for GPS, radio transceiver, and other components in the tracker tag provides desired independence for the system. Stated another way, the tracker tag can provide real-time communication of certain operational/environmental parameters through a passive sensing device on an aircraft, ground vehicles and watercraft as well as reporting the location of the aircraft, ground vehicles or watercraft because the tracker tag is separately powered and not under the control of the aircraft, ground vehicles or watercraft or its operator/crew (i.e., staff). Data associated with the tracking system can be displayed on various common devices (e.g., typical displays found on pagers, cell phones, wireless PDA computers) and is accessible over the Internet. A scalable computer architecture and design permits the system to handle all the data (database warehousing and distribution) that is being received (encoded, encrypted and compressed) from multiple tracker tags and create displays individually tailored to users/subscribers on pagers, cell phones and/or PAD computers via the Internet.

While the invention has been described in conjunction with exemplary embodiments, it is to be appreciated that many alternatives, modifications and variations will be apparent to those skilled in the art. Accordingly, the embodiments of the invention in the preceding description are intended to be illustrative rather than limiting, of the spirit and scope of the invention. More specifically, it is intended that the invention embrace all alternatives, modifications and variations of the exemplary embodiments described herein.

What is claimed is:

1. An apparatus (10, 26) for tracking a movable asset (16) and providing tracking information to a monitoring device (22), including:

a tracker tag (12) adapted to selectively receive position and time data from multiple global positioning system satellites (240) of a global positioning system satellite constellation (24), the position data representing a position of each global positioning system satellite from which data was received with respect to center of Earth (37) and the time data representing a time of day associated with the position data, the tracker tag disposed along an exterior of the movable asset at a location facilitating reception of the position and time data, the tracker tag combining the position and time data from the multiple global positioning system satellites for selectively transmitting combined position and time data via a data communication network (18), wherein the tracker tag is adapted to receive command and control information via the data communication network, wherein the tracker tag is electrically isolated from the asset and inoperative from equipment associated with the asset; and a tracking information server (14) for command and control of the tracker tag, wherein the tracking information server is adapted to selectively transmit command and control information to the tracker tag via the data communication network, wherein the tracking information server is adapted to receive combined position and time data from the tracker tag via the data communication network, wherein the tracking information server is adapted to selectively receive command and control information from the monitoring device via a tracking information network (20), wherein the tracking information server is adapted to selectively process the combined position and time data based on preprogrammed instructions and command and control information to produce the tracking information, wherein the tracking information is associated with the asset and selectively accessible to the monitoring device via the tracking information network.

2. The apparatus as set forth in claim 1, wherein the data communication network includes a terrestrial telephone network and a data communication satellite system, the data communication satellite system further including a data communication satellite constellation and a data communication satellite/terrestrial telephone gateway in communication with the data communication satellite constellation and the terrestrial telephone network.

3. The apparatus as set forth in claim 2, wherein the terrestrial telephone network is a PSTN (32), the data communication satellite system is an Iridium satellite system, the data communication satellite constellation is an Iridium satellite constellation (28), and the data communication satellite/terrestrial telephone gateway is an Iridium satellite/PSTN gateway (30).

4. The apparatus as set forth in claim 1, wherein the tracking information network includes an Internet (36) and a data communication satellite system, the data communication satellite system further including a data communication satellite constellation and a data communication satellite/Internet gateway in communication with the data communication satellite constellation and the Internet.

5. The apparatus as set forth in claim 4, wherein the data communication satellite system is an Iridium satellite system, the data communication satellite constellation is an Iridium satellite constellation (28), and the data communication satellite/Internet gateway is an Iridium satellite/Internet gateway (36).

6. The apparatus as set forth in claim 1, the tracker tag including:
- a global positioning system receiver (65) adapted to selectively receive the position and time data;
- an environmental sensor (66) for sensing vibration;
- a data buffer (76) for selectively storing the combined position and time data and detected event data; and
- a controller (68) in communication with the global positioning system receiver, environmental sensor, and data buffer, wherein the controller compares vibration measurements from the environmental sensor with predetermined thresholds to detect at least one of a group of events, the group of events including: i) startup of a power plant associated with the asset, ii) shutdown of the power plant, iii) start of movement of the asset, iv) cessation of movement of the asset, v) excessive increase in acceleration of the asset, and vi) excessive decrease in acceleration of the asset, wherein the controller selectively stores the combined position and time data and detected event data in the data buffer.

7. The apparatus as set forth in claim 6, wherein the environmental sensor includes an accelerometer.

8. The apparatus as set forth in claim 6, wherein the global positioning system receiver begins receiving the position and time data and the controller begins storing the combined position and time data and the detected event data in the data buffer when at least one of the group of events are detected.

9. The apparatus as set forth in claim 6, wherein the tracker tag begins transmitting the combined position and time data and the detected event data when at least one of the group of events are detected.

10. The apparatus as set forth in claim 1, the tracker tag including:
- a global positioning system receiver (65) adapted to selectively receive the position and time data;
- a data buffer (76) for selectively storing the combined position and time data and detected event data; and
- a controller (68) in communication with the global positioning system receiver and data buffer, wherein the controller combines the position and time data received by the global positioning system receiver in a trilateration fashion to produce XYZ and time data when the position and time data was received from at least four global positioning satellites, the XYZ data representing a latitude, a longitude, and an altitude, respectively, and the time data representing a time of day associated with the XYZ data, the combined position and time data including the XYZ and time data.

11. The apparatus as set forth in claim 10, wherein the resolution of the XYZ data is about 18 inches in latitude, about 18 inches in longitude, and about 18 inches in altitude.

12. The apparatus as set forth in claim 10, wherein the controller compares the XYZ data to predetermined XYZ coordinate limits to detect at least one of a group of events, the group of events including: i) asset is in proximity of a restricted area, ii) asset is in a restricted area, iii) asset is in proximity of a hazardous area, iv) asset is in a hazardous area, v) asset is at a way point, vi) asset is at a destination, vii) asset is off course, viii) asset is nearing a high stress condition, ix) asset is experiencing a high stress condition, x) asset is experiencing excessive loss of altitude, xi) asset is experiencing excessive increase in altitude, xii) asset is experiencing unexpected stoppage/slow down, and xiii) asset is exceeding a speed restriction.

13. The apparatus as set forth in claim 12, wherein the global positioning system receiver begins receiving the position and time data and the controller begins storing the combined position and time data and the detected event data in the data buffer when at least one of the group of events are detected.

14. The apparatus as set forth in claim 12, wherein the tracker tag begins transmitting the combined position and time data and the detected event data from the data buffer when at least one of the group of events are detected.

15. The apparatus as set forth in claim 10, wherein the global positioning system receiver begins receiving the position and time data and the controller begins storing the combined position and time data and the detected event data in the data buffer when a command to begin receiving is received via the data communication network.

16. The apparatus as set forth in claim 10, wherein the tracker tag begins transmitting the combined position and time data and the detected event data from the data buffer when a command to begin transmitting is received via the data communication network.

17. The apparatus as set forth in claim 1, the tracker tag including:
- a data communication link (48) adapted to transmit data via the data communication network and adapted to receive data via the data communication network;
- a data buffer (76) for storing the combined position and time data, a tracker tag identification data, and a predetermined tag profile;
- a controller (68) in communication with the data communication link and the data buffer, wherein the controller controls data transmissions in a burst fashion by waiting for a group of the combined position and time data to accumulate in the data buffer based on the predetermined tag profile and commands received via the data communication network, wherein the controller includes the tracker tag identification data in each data transmission burst.

18. The apparatus as set forth in claim 17, wherein the controller controls the timing between transmission bursts to maintain a virtual private network connection over a public data communication system within the data communication network.

19. The apparatus as set forth in claim 18, wherein the public data communication system is the Iridium satellite system.

20. The apparatus as set forth in claim 17, wherein the controller controls the timing between transmission bursts so that the apparatus can provide real-time tracking information.

21. The apparatus as set forth in claim 17, wherein the controller controls the timing between transmission bursts to minimize transmission time over the data communication network.

22. The apparatus as set forth in claim 17, wherein the controller delays a transmission burst until a begin transmitting command is received via the data communication network.

23. The apparatus as set forth in claim 17, wherein the controller maintains the combined position and time data in the data buffer associated with each transmission burst until an acknowledgment of receipt of the transmission burst is received via the data communication network.

24. The apparatus as set forth in claim 1, the tracking information server including:
   a communication link (94) adapted to receive the combined position and time data and transmit command and control information wherein the communication link is adapted to receive tracker tag identification data via the data communication network;
   a data warehouse (96) in communication with the communication link for processing the combined position and time data into asset data based on a first tracking link between the tracker tag identification data and the asset;
   a Web server (98) providing a set of Web pages for displaying tracking information, wherein the Web server is in communication with the data warehouse and populates at least one selected Web pages with asset data mined from the data warehouse;
   a client communication interface (102) in communication with the Web server and adapted to selectively provide the monitoring device with access to the tracking information; and
   a system controller (92) in communication with the communication link, the data warehouse, the Web server, and the client communication interface, wherein the system controller stores a predetermined tag profile and controls processing of the combined position and time data into tracking information using the predetermined tag profile, wherein the system controller is adapted to command the tracker tag and provide the tracker tag with control information using the predetermined tag profile.

25. The apparatus as set forth in claim 24, wherein the data warehouse processes the combined position and time data received from the tracker tag in a trilateration fashion to produce XYZ and time data when position and time data was received from at least four global positioning satellites, the XYZ data representing a latitude, a longitude, and an altitude, respectively, and the time data representing a time of day associated with the XYZ data.

26. The apparatus as set forth in claim 25, wherein the data warehouse compares the XYZ data to predetermined XYZ coordinate limits to detect at least one of a group of events, the group of events including: i) asset is in proximity of a restricted area, ii) asset is in a restricted area, iii) asset is in proximity of a hazardous area, iv) asset is in a hazardous area, v) asset is at a way point, vi) asset is at a destination, vii) asset is off course, viii) asset is nearing a high stress condition, ix) asset is experiencing a high stress condition, x) asset is experiencing excessive loss of altitude, xi) asset is experiencing excessive increase in altitude, xii) asset is experiencing unexpected stoppage/slow down, and xiii) asset is exceeding a speed restriction.

27. The apparatus as set forth in claim 25, wherein the data warehouse produces asset data by associating the XYZ and time data with the asset using the tracker tag identification data and the first tracking link and stores the asset data.

28. The apparatus as set forth in claim 27, wherein the data warehouse processes the asset data according to the predetermined tag profile to produce at least one asset report.

29. The apparatus as set forth in claim 28, the tracking information server further including:
   a file server (100) in communication with the data warehouse and the Web server, wherein the data warehouse communicates the asset reports to the file server and the file server stores the at least one asset report;
   wherein at least one Web page includes at least one hypertext link to the at least one asset report.

30. The apparatus as set forth in claim 28, wherein the types of asset reports include at least one of a group of reports, the group of reports including: i) asset log, ii) operation log, iii) operator log, iv) location and time in restricted area, v) location and time in hazardous area, vi) location and time off course, v) location and time in high stress condition, and vi) location and time of unexpected stoppage.

31. The apparatus as set forth in claim 25, wherein the data warehouse produces element data by associating the XYZ and time data with an element of the asset using the tracker tag identification data and the first and second tracking links and stores the element data, wherein the second tracking link identifies a relationship between the asset and the element.

32. The apparatus as set forth in claim 31, wherein the element is any one of a group of element, the group of elements including: an operator, a crew member, a passenger, an owner, a cargo item, an operational equipment item, and a support equipment item.

33. The apparatus as set forth in claim 31, wherein the asset is an aircraft and the element is a fuel pump.

34. The apparatus as set forth in claim 24, wherein the Web server is adapted to present tracking information to an authorized client user via the Web pages and to respond to client user selections and requests presented associated with the Web pages.

35. The apparatus as set forth in claim 24, wherein the tracking information presented in the Web pages includes a graphical symbol representing XYZ data associated with the asset, wherein the symbol is overlaid on a suitable map.

36. The apparatus as set forth in claim 35, wherein the suitable map is a one of a group of maps, the group of maps including: a street map, an aviation map, a water map, a rail map, and a three-dimensional environment.

37. The apparatus as set forth in claim 35, wherein the XYZ data is mined from the asset data in a sequential fashion and the graphical symbol is repeatedly overlaid to show movement of the asset in reference to the map.

38. The apparatus as set forth in claim 35, wherein the XYZ data is mined from the asset data in response to selections and requests presented via the Web pages by a client user monitoring the tracking information.

39. The apparatus as set forth in claim 24, wherein the tracking information server is adapted to communicate with a client user associated with the asset via the tracking information network to configure the first tracking link.

40. The apparatus as set forth in claim 24, wherein the first tracking link includes tracking link information, wherein the tracking link information includes at least one of a group of information types, the group of information types including: i) asset identification data, ii) asset certification, iii) asset operational information, and iv) asset maintenance information.

41. The apparatus as set forth in claim 1, wherein the preprogrammed instructions include a predetermined tag profile and the tracking information server is adapted to communicate with a client user associated with the asset via the tracking information network to configure the predetermined tag profile according to predetermined tracking requirements for the asset.

42. The apparatus as set forth in claim 1, wherein the preprogrammed instructions include a predetermined tag profile, wherein the tracking information server is adapted to transmit the preprogrammed instructions to the tracker tag via the data communication network, wherein the tracker tag is adapted to receive the preprogrammed instructions via the data communication network.

43. The apparatus as set forth in claim 42, wherein the predetermined tag profile includes at least one of a group of control information items associated with the asset, the group of control information items including: i) tracking information to be monitored and frequency, ii) vibration thresholds associated with startup and shutdown, iii) vibration thresholds associated with normal movement, iv) restricted areas, v) hazardous areas, vi) planned course, vii) high stress conditions, viii) fuel and fuel consumption information, and ix) reports to be processed and report frequency.

44. The apparatus as set forth in claim 1, wherein the movable asset is one of a group including a truck, a van, an automobile, a cargo container, a trailer, a bus, a train, a locomotive, a rail car, an aircraft, and a watercraft.

45. The apparatus as set forth in claim 1, wherein the tracker tag is disposed and oriented with line of sight access to the sky during normal movement of the asset.

46. The apparatus as set forth in claim 1, wherein the tracker tag is not accessible to operators, crew, and passengers of the asset during normal movement of the asset.

47. The apparatus as set forth in claim 1, wherein the tracker tag does not require local operator intervention during normal operation of the apparatus.

48. The apparatus as set forth in claim 1, the tracker tag including:
  a data communication link (48) adapted to selectively transmit the combined position and time data;
  a data acquisition and processing module (49) adapted to selectively receive the position and time data, wherein the data acquisition and processing module is in communication with the data communication link combines the position and time data to form the combined position and time data, and selectively communicates the combined position and time data to the data communication link; and
  a power source and conversion module (47) in communication with the data communication link and the data acquisition and processing module to provide and distribute power for operation of tracker tag, wherein the power provided includes power from a power source (50) and a backup battery (52).

49. The apparatus as set forth in claim 48, wherein the power source includes at least one of a group of power sources, the group of power sources including: a piezoelectric power generator, a solar collector panel (86), and a primary battery.

50. A tracking system (170, 176), including:
  a monitoring device (22) for displaying tracking information associated with a movable asset (16);
  a tracking information network (20) in communication with the monitoring device for communicating the tracking information to the monitoring device;
  a data communication network (18);
  a tracker tag (12) adapted to selectively receive position and time data from multiple global positioning system satellites (240) of a global positioning system satellite constellation (24), the position data representing a position of each global positioning system satellite from which data was received with respect to center of Earth (37) and the time data representing a time of day associated with the position data, the tracker tag disposed along an exterior of the movable asset at a location facilitating reception of the position and time data, the tracker tag combining the position and time data from the multiple global positioning system satellites for selectively transmitting combined position and time data via the data communication network, wherein the tracker tag receives command and control information via the data communication network; and
  a tracking information server (14) for command and control of the tracker tag, wherein the tracking information server selectively transmits command and control information to the tracker tag via the data communication network, wherein the tracking information server receives combined position and time data from the tracker tag via the data communication network, wherein the tracking information server selectively receives command and control information from the monitoring device via the tracking information network, wherein the tracking information server selectively processes the combined position and time data to produce the tracking information, wherein the tracking information is selectively accessible to the monitoring device via the tracking information network.

51. The tracking system as set forth in claim 50, wherein the tracker tag is electrically isolated from the asset and inoperative from equipment associated with the asset.

52. The apparatus as set forth in claim 50, the tracker tag including:
  a global positioning system receiver (65) adapted to selectively receive the position and time data;
  an environmental sensor (66) for sensing vibration;
  a data buffer (76) for selectively storing the combined position data and time data and detected event data; and
  a controller (68) in communication with the global positioning system receiver, environmental sensor, and data buffer, wherein the controller compare vibration measurements from the environmental sensor with predetermined thresholds to detect at least one of a group of events, the group of events including: i) startup of a power plant associated with the asset, ii) shutdown of the power plant, iii) start of movement of the asset, iv) cessation of movement of the asset, v) excessive increase in acceleration of the asset, and vi) excessive decrease in acceleration of the asset, wherein the controller selectively stores the combined position and time data and the detected event data in the data buffer.

53. The apparatus as set forth in claim 52, wherein the controller combines the position and time data received by the global positioning system receiver in a trilateration fashion to produce XY and time data when position and time data is received from at least three global positioning satellites, the XY data representing a latitude and a longitude, respectively, and the time data representing a time of day associated with the XY data, the combined position and time data including the XY and time data.

54. The apparatus as set forth in claim 50, wherein the data communication network includes a land line terrestrial telephone network and a wireless terrestrial telephone system, the wireless terrestrial telephone system further including a wireless terrestrial telephone network and a wireless terrestrial telephone/land line terrestrial telephone gateway in communication with the wireless terrestrial telephone network and the land line terrestrial telephone network.

55. The apparatus as set forth in claim 50, wherein the data communication network includes a wireless LAN (178), a wire line LAN (182), and a wireless/wire line LAN hub (180) in communication with the wireless LAN and the wire line LAN (182).

56. The apparatus as set forth in claim 50, wherein the tracking information network includes an Internet (34) and a land line telephone network in communication with the Internet.

57. The apparatus as set forth in claim 50, wherein the tracking information network includes a wire line LAN (180).

58. A method for tracking a movable asset and providing tracking information to a subscriber, including the steps:
   a) associating the subscriber with a tracker tag and the tracker tag with the moveable asset, wherein the tracker tag is disposed along an exterior of the movable asset at a location in which the tracker tag has line of sight access to the sky during normal movement of the asset, wherein the tracker tag is electrically isolated from the asset and inoperative from equipment associated with the asset;
   b) granting the subscriber using a monitoring device access to a Web site via a tracking information network, wherein the Web site includes at least one tracking information Web page that displays a map suitable for monitoring movement of the asset;
   c) receiving position and time data from at least four global positioning system satellites of a global positioning system satellite constellation at the tracker tag, the position data representing a position of each global positioning system satellite from which data was received with respect to center of Earth and the time data representing a time of day associated with the position data;
   d) communicating the position and time data to a tracking information server via a data communication network;
   e) processing the position and time data in a trilateration fashion to produce XYZ and time data, the XYZ data representing a latitude, a longitude, and an altitude, respectively, and the time data representing a time of day associated with the XYZ data;
   f) displaying the XYZ and time data on the at least one Web page and overlaying a symbol on the map at a coordinate associated with the XYZ data; and
   g) repeating steps c) through f) for a predetermined time at a predetermined interval.

59. The apparatus as set forth in claim 58, wherein the data communication network includes a PSTN, an Iridium satellite constellation, and an Iridium satellite/PSTN gateway in communication with the PSTN and the Iridium satellite constellation, wherein the tracker tag is in communication with the Iridium satellite constellation and the tracking information is displayed to the subscriber at the monitoring device when the asset is substantially anywhere in the world with line of sight access to the sky.

60. The apparatus as set forth in claim 58, wherein the tracking information network includes an Internet, an Iridium satellite constellation, and an Iridium satellite/Internet gateway in communication with the Internet and the Iridium satellite constellation, wherein the monitoring device is in communication with the Iridium satellite constellation and the tracking information is displayed to the subscriber at the monitoring device when the subscriber is substantially anywhere in the world.

* * * * *